United States Patent
Okada

(10) Patent No.: US 8,347,160 B2
(45) Date of Patent: Jan. 1, 2013

(54) INFORMATION COMMUNICATION TERMINAL, RADIO COMMUNICATION APPARATUS AND RADIO COMMUNICATION NETWORK SYSTEM CAPABLE OF PERFORMING COMMUNICATION CORRESPONDING TO PURPOSE

(75) Inventor: Koki Okada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 1189 days.

(21) Appl. No.: 12/171,700

(22) Filed: Jul. 11, 2008

(65) Prior Publication Data

US 2009/0031182 A1    Jan. 29, 2009

(30) Foreign Application Priority Data

Jul. 13, 2007 (JP) ................................. 2007-184603
Aug. 8, 2007 (JP) ................................. 2007-206326

(51) Int. Cl.
*G06F 11/00* (2006.01)
(52) U.S. Cl. .......................... 714/746; 714/707; 714/774
(58) Field of Classification Search .................. 714/746, 714/707, 775, 704, 706, 774, 776
See application file for complete search history.

(56) References Cited

U.S. PATENT DOCUMENTS

| | | | | |
|---|---|---|---|---|
| 5,349,589 A | * | 9/1994 | Chennakeshu et al. | 714/795 |
| 6,088,826 A | * | 7/2000 | Teich | 714/774 |
| 6,161,203 A | * | 12/2000 | Zuranski et al. | 714/707 |
| 6,977,888 B1 | * | 12/2005 | Frenger et al. | 370/218 |
| 2006/0067290 A1 | | 3/2006 | Miwa et al. | |
| 2009/0028094 A1 | | 1/2009 | Okada et al. | |

FOREIGN PATENT DOCUMENTS

| | | |
|---|---|---|
| JP | 61-242433 | 10/1986 |
| JP | 01-175341 | 7/1989 |

(Continued)

OTHER PUBLICATIONS

U.S. Appl. No. 12/171,672.

(Continued)

*Primary Examiner* — Fritz Alphonse
(74) *Attorney, Agent, or Firm* — Fish & Richardson P.C.

(57) ABSTRACT

An information communication terminal performs communications with another information communication terminal over a radio communication network system. In the information communication terminal, a receiving unit receives an externally transmitted frame. In a state where error correction is to be performed, a correction processing unit outputs data after performing error correction according to correction information in the frame on data in the frame received by the receiving unit. In a state where the error correction is not to be performed, the correction processing unit outputs the data without performing the error correction on the data in the frame received by the receiving unit. A determining unit determines whether the error correction is to be performed by the correction processing unit or not.

12 Claims, 37 Drawing Sheets

FOREIGN PATENT DOCUMENTS

| | | |
|---|---|---|
| JP | 03-267844 | 11/1991 |
| JP | 04-207431 | 7/1992 |
| JP | 09-205372 | 8/1997 |
| JP | 10-190838 | 7/1998 |
| JP | 2000-115012 | 4/2000 |
| JP | 2001-144856 | 5/2001 |
| JP | 2002-185550 | 6/2002 |
| JP | 2003-032234 | 1/2003 |
| JP | 2005-210211 | 8/2005 |
| JP | 2005-295216 | 10/2005 |
| JP | 2005-311608 | 11/2005 |
| JP | 2005-323117 | 11/2005 |
| JP | 2006-191188 | 7/2006 |
| JP | 2009-33490 | 2/2009 |

OTHER PUBLICATIONS

U.S. Appl. No. 12/179,904.
Communication in Japanese Patent Application No. 2007-202169 (dated Mar. 21, 2012), with English translation.
Japanese Communication for JP Application No. 2007-184603 (dated Mar. 6, 2012), with English translation.

* cited by examiner (WHEN AUTOMATIC ADJUSTING FUNCTION IS NOT EMPLOYED)

(WHEN AUTOMATIC ADJUSTING FUNCTION IS EMPLOYED)

FIG.36

| VALUE (5 BYTES) OF MODE INFO | Meaning |
|---|---|
| "STANDARD" | STANDARD AD HOC MODE |
| "INTMT" | INTERMITTENT TRANSMISSION-RECEPTION AD HOC MODE |
| "SCNLS" | SCANLESS AD HOC MODE |

Mode Info="STANDARD"

INFORMATION COMMUNICATION TERMINAL, RADIO COMMUNICATION APPARATUS AND RADIO COMMUNICATION NETWORK SYSTEM CAPABLE OF PERFORMING COMMUNICATION CORRESPONDING TO PURPOSE

BACKGROUND OF THE INVENTION

1. Field of the Invention

The present invention relates to an information communication terminal, a radio communication apparatus and a radio communication network system, and particularly to an information communication terminal, a radio communication apparatus and a radio communication network system that can perform a communication corresponding to a purpose.

2. Description of the Background Art

In recent years, radio communications performed between a plurality of information communication terminals without using an access point are becoming widely available. The network that is formed of only terminals capable of such radio communications is called "ad hoc network".

Various techniques relating to terminals that can perform communications over the ad hoc network have been disclosed. For example, a patent document 1 (Japanese Patent Laying-Open No. 2000-115012) has disclosed a portable communication apparatus that can easily exchange data between an indefinite number of apparatuses.

Further, a patent document 2 (Japanese Patent Laying-Open No. H03-267844) has disclosed a technique in which a redundant code called "FCS (Frame Check Sequence)" is added to each frame, and a receiver performs error check on each frame by checking the redundant code.

In the above patent document 1, each portable communication apparatus basically repeats transmission of its own message at intervals of five seconds for allowing mutual transmission of messages between the indefinite number of apparatuses. When a power saving mode (operation mode having a long transmission interval) or a sleep mode (pause) is detected while the above message transmission is being repeated, the apparatus enters the power saving mode or the sleep mode. In these modes, the transmission intervals are long, either the transmission or reception stops, a transmission radio wave is weak or an intermittent operation is performed. However, these modes are selected according to conditions relating to whether the reception occurs within a predetermined time or not, and this document has not disclosed a technique for entering the power saving mode or the sleep mode according to a length of a standby period for the reception.

In the ad hoc network using a wireless (radio) LAN (Local Area Network), each terminal is required to have small power consumption because it is of a portable type. As described above, however, the conventional apparatus is merely configured to enter always a standby state for the reception, or to enter the sleep mode or the power saving mode when it does not receive the data over a predetermined period, and measures for reducing the power consumption more finely have not been proposed.

In some cases, it is desired to transmit, e.g., reproducible uncompressed A/V data (Audio-Visual data) to a terminal on the other end of communications without error check even when data corruption may occur to a certain extent. Even in these cases, an error frame having corrupted data is abandoned on a reception side because the transmission over the conventional LAN is configured to perform always FCS error check (i.e., error check performed on each frame by checking a redundant code indicated by the FCS) is performed on a frame-by-frame basis. Consequently, the A/V data stored in the abandoned frame is not received, and therefore data dropout occurs on the reception side, resulting in a problem that a sound is not continuously reproduced on the reception side when the transmitted data is audio data.

This will be described below with reference to FIG. 46. FIG. 46 schematically shows a conventional communication sequence for performing the FCS error check on the ad hoc network. In FIG. 46, the transmitting-side terminal is formed of a host system and a communication circuit, and a receiving-side terminal is likewise formed of a communication circuit and a host system. Each terminal performs mutual communications between the host system and the communication circuit.

Referring to FIG. 46, on the transmitting-side terminal, a first data transmission request provided from the host system is transmitted as a first frame via the communication circuit to the network.

When the communication circuit in the receiving-side terminal receives the first frame, it performs the FCS check. When it is determined that there is no error (OK), it provides the received first data to the host system, produces a frame of ACK (ACKnowledgement) and transmits it to the network.

Subsequently, the transmitting-side terminal transmits a second frame storing second data to the receiving-side terminal.

On the receiving-side terminal, when the communication circuit receives this second frame, it performs the FCS error check on the data of the second frame, and will abandon the second frame when the communication circuit on the receiving-side terminal determines that data is corrupted (NG). Therefore, the host system (reproducing apparatus) on the receiving-side terminal cannot obtain the data stored in the second frame, and cannot reproduce this data. Consequently, dropout of the reproduction data (discontinuity in sound) occurs in the host system. Since the data is abandoned (i.e., the data is not correctly received), the communication circuit in the receiving-side terminal does not produce the frame of ACK.

Thereafter, the transmitting-side terminal transmits the second frame again in response to the fact that it does no receive the ACK from the receiving-side terminal even after standby over a predetermined period. The receiving-side terminal receives the retransmitted second frame, and performs the FCS error check. When it is determined from the error check that there is no error (OK), the communication circuit provides the data of the second frame to the host system side. The host system reproduces a sound from the received data. Thereafter, the communication circuit in the receiving-side terminal will perform the FCS error check on each received frame in a similar manner.

According to FIG. 46, the host system in the receiving-side terminal cannot obtain the received data during a period from the reception (reproduction) of the first data to the reception (reproduction) of the second data so that dropout of the sound occurs to cause discontinuity in sound which gives the user an unpleasant feeling during this period. In data communications requiring a real-time property (real-time response), it is required to overcome the above unpleasant feeling.

However, the host system in the receiving-side terminal may have a function of repairing or correcting corrupt data (second data), and thereby the error correction may restore the data. In this case, no dropout occurs in output (reproduced) sound, and the sound can be reproduced substantially correctly to avoid a trouble interfering with listening by the user.

SUMMARY OF THE INVENTION

The invention has been developed in view of the above circumstances, and an object of the invention is to provide an information communication terminal, a radio communication apparatus and a radio communication network system that allow a receiving-side terminal to receive data without selectively performing error correction on the received data.

Another object of the invention is to provide an information communication terminal, a radio communication apparatus and a radio communication network system that can reduce power consumption without causing a trouble in communications.

An information communication terminal according to an aspect of the invention includes a receiving unit receiving an externally transmitted frame; and a correction processing unit correcting an error in data. The correction processing unit being configured, in a state for performing the error correction, to output the data after performing error correction according to correction information in the frame on the data in the frame received by the receiving unit, and, in a state for not performing the error correction, to output the data without performing the error correction on the data in the frame received by the receiving unit. The information communication terminal further includes a determining unit determining whether the error correction is to be performed on the correction processing unit or not.

An information communication terminal according to another aspect of the invention performs communications over a radio network. The information communication terminal includes a receiving unit receiving a frame transmitted from the different information communication terminal; and a processing unit accepting and processing data in the frame received by the receiving unit. The receiving unit includes a data receiving unit receiving the frame storing the data and correction information for error correction from the different information communication terminal, a correction processing unit performing the error correction on the data in the frame received by the data receiving unit according to the correction information in the frame, and then providing the data to the processing unit, and a correction determining unit determining, in response to every reception of the frame by the data receiving unit, based on preset correction enable/disable data whether the error correction is to be performed or not, and providing the data in the frame received by the data receiving unit to the processing unit without performing the correction processing by the correction processing unit when the correction determining unit determines that the error correction is not to be performed.

A radio communication apparatus according to an aspect of the invention is capable of communications over a radio network. The radio communication apparatus is arranging in an information communication terminal having a processing unit, and includes a receiving unit receiving a frame transmitted from the different information communication terminal, and providing data in the received frame to the processing unit of the information communication terminal. The receiving unit includes a data receiving unit receiving the frame storing the data and correction information for error correction from the different information communication terminal, a correction processing unit performing the error correction on the data in the frame received by the data receiving unit according to the correction information in the frame, and then providing the data to the processing unit, and a correction determining unit determining, in response to every reception of the frame by the data receiving unit, based on preset correction enable/disable data whether the error correction is to be performed or not, and providing the data in the frame received by the data receiving unit to the processing unit without performing the correction processing by the correction processing unit when the correction determining unit determines that the error correction is not to be performed.

A radio communication network system according to an aspect of the invention includes a first information communication terminal; and a second information communication terminal receiving data transmitted by the first information communication terminal. The first information communication terminal includes a data transmitting unit transmitting a frame storing data and correction information for error correction. The second information communication terminal includes a receiving unit receiving the frame transmitted from the data transmitting unit of the first information communication terminal, and a processing unit accepting and processing the data in the frame received by the receiving unit. The receiving unit includes a data receiving unit receiving the frame transmitted from the data transmitting unit of the first information communication terminal, a correction processing unit performing the error correction on the data in the frame received by the data receiving unit according to the correction information in the frame, and then providing the data to the processing unit, and a correction determining unit determining, in response to every reception of the frame by the data receiving unit, based on preset correction enable/disable data whether the error correction is to be performed or not, and providing the data in the frame received by the data receiving unit to the processing unit without performing the correction processing by the correction processing unit when the correction determining unit determines that the error correction is not to be performed.

An information communication terminal according to still another aspect of the invention includes a communication unit receiving a frame transmitted from a different information communication terminal; a power supply unit supplying a power to each of circuits in the communication unit; and a clock circuit supplying a clock for operating each of the circuits in the communication unit to the circuits. The communication unit is set to a period for waiting for reception of the frame when the communication unit is being supplied with the power. The period for waiting for the reception includes a sleep period for stopping supply of the clock from the clock circuit and a wake period for supplying the clock from the clock circuit. The sleep period and the wake period are alternately repeated. The information communication terminal changes a length of the wake period when a period during which the frame cannot be received continues for a predetermined period.

A radio communication apparatus according to another aspect of the invention according to another aspect of the invention includes a communication unit receiving a frame transmitted from a different information communication terminal; a power supply unit supplying a power to each of circuits in the communication unit; and a clock circuit supplying a clock for operating each of the circuits in the communication unit to the circuits. The radio communication apparatus is set to a period for waiting for reception of the frame when the communication unit is being supplied with the power. The period for waiting for the reception includes a sleep period for stopping supply of the clock from the clock circuit and a wake period for supplying the clock from the clock circuit. The sleep period and the wake period are alternately repeated. The radio communication apparatus changes a length of the wake period when a period during which the frame cannot be received continues for a predetermined period, and is arranged in an information communication terminal, A radio communication network system according to another aspect of the invention includes a first information communication terminal, and a second information communication terminal performing communications with the first information communication terminal. The first information communication terminal includes a communication unit receiving a frame transmitted from the second information communication terminal, a power supply unit supplying a power to each of circuits in the communication unit, and a clock circuit supplying a clock for operating each of the circuits in the communication unit to the circuits. The communication unit is set to a period for waiting for reception of the frame when the communication unit is being supplied with the power. The period for waiting for the reception includes a sleep period for stopping supply of the clock from the clock circuit and a wake period for supplying the clock from the clock circuit. The sleep period and the wake period are alternately repeated. The radio communication network system changes a length of the wake period when a period during which the frame cannot be received continues for a predetermined period.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 36 illustrates communication mode information and its means according to the fifth embodiment.

DESCRIPTION OF THE PREFERRED EMBODIMENTS

Embodiments of a radio communication network system of the invention will be described below with reference to the drawings.

[First Embodiment]

Figure 1A:
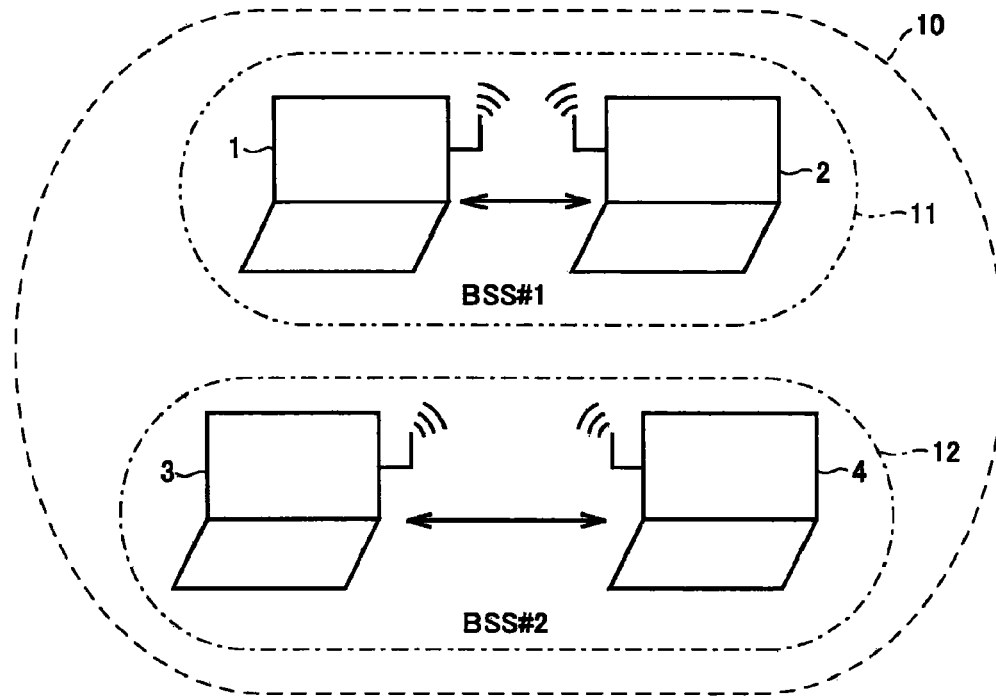
FIGS. 1A and 1B schematically show an example of an ad hoc network that is a first embodiment of a radio communication network system of the invention.
Figure 1B:
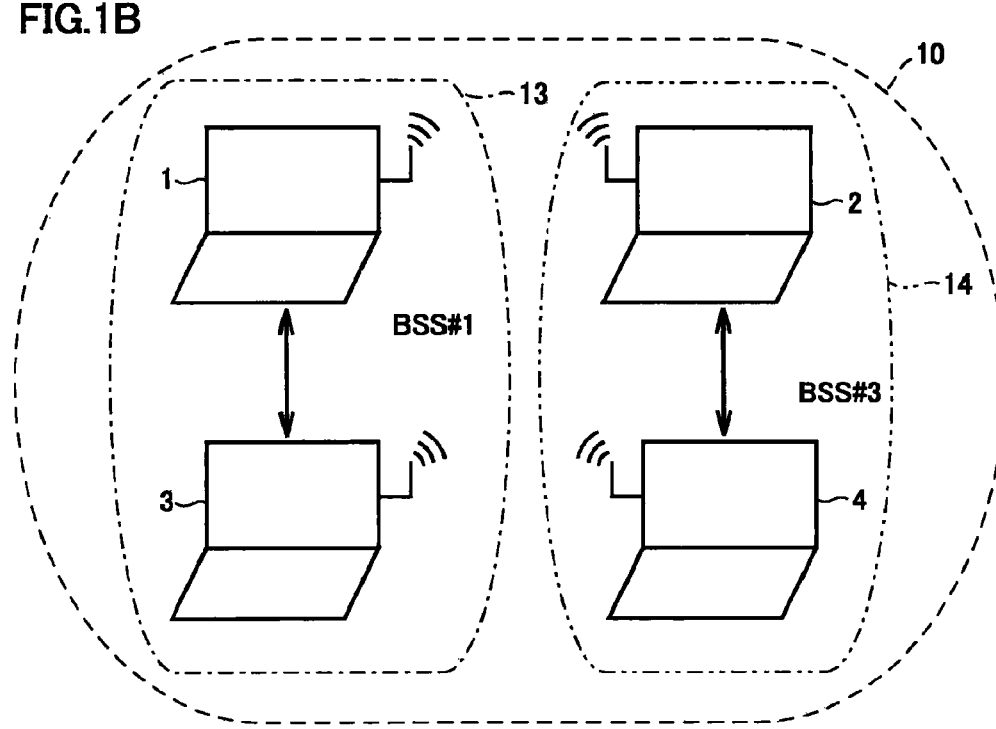

FIGS. 1A and 1B schematically show an example of a structure of an ad hoc network that is a first embodiment of the radio communication network system of the invention.

Referring to FIG. 1A, a network 10 includes terminals 1-4 that are information communication terminals of an embodiment of the invention. Network 10 is a radio communication network (ad hoc network) that is formed of the plurality of information communication terminals and does not use a base station.

In network 10 of the embodiment, there are formed a plurality of radio cells each of which uses IBSSID (Independent Basic Service Set IDentification) different from that of others and is independent of each other. More specifically, communications are performed between terminals 1 and 2 using certain IBSSID (represented as "BSS#1" in FIGS. 1A and 1B) and, at the same time, communications can be performed between terminals 3 and 4 using another, i.e., different IBSSID. In FIG. 1A, a radio cell formed using the "certain IBSSID" is represented as a radio cell 11, and a radio cell formed using the "different IBSSID" (represented by way of example as "BSS#2" in FIG. 1A) is represented as a radio cell 12.

In network 10 of the embodiment, terminal 1 can perform communications with terminal 3 or 4 using the "certain IBSSID" (or the different IBSSID), and terminal 2 can likewise perform communications with terminal 3 or 4 using the "different IBSSID" (or a further different IBSSID). In FIG. 1B, a radio cell formed between terminals 1 and 3 using the "BSS#1" is represented as a radio cell 13, and a radio cell formed between terminals 2 and 4 using "BSS#3" (that is an example of further different IBSSID in FIG. 1B) is represented as a radio cell 14.

Figure 2:
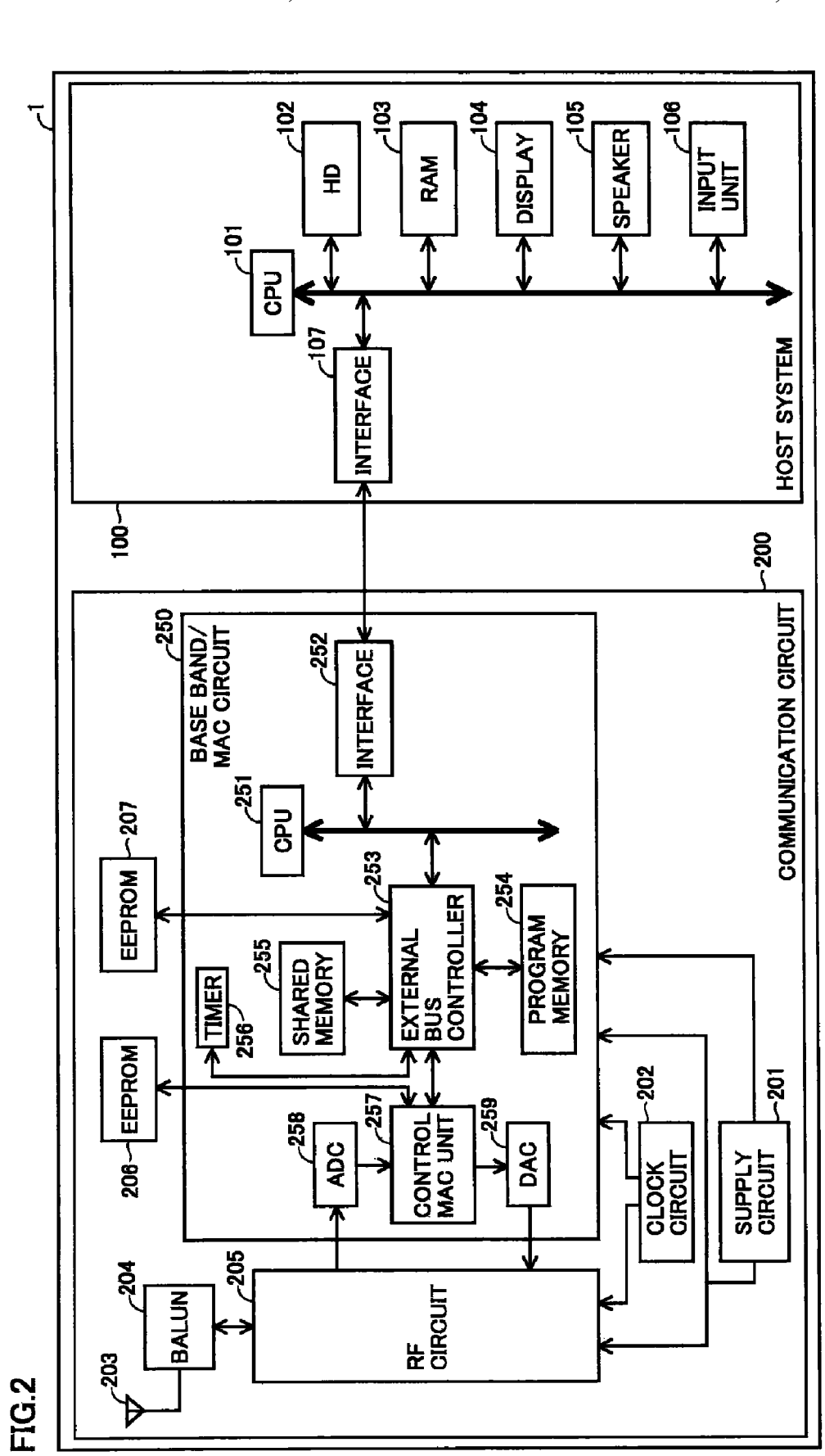
FIG. 2 schematically shows a hardware structure of a terminal in FIG. 1A or 1B.

FIG. 2 schematically shows a hardware structure of terminal 1 in FIG. 1A or 1B.

Referring to FIG. 2, terminal 1 is primarily formed of a host system 100 and a communication circuit 200. Host system 100 includes a CPU that controls an entire operation of host system 100. Host system 100 executes various applications. A Hard Disk (HD) 102 stores programs of the applications. Host system 100 includes a RAM (Random Access Memory) 103 providing a work area of a CPU 101, a display 104 displaying information, a speaker 105 outputting voice and sound, an input unit 106 such as keys, buttons and the like used for externally inputting information and an interface 107 transmitting and receiving information to and from communication circuit 200.

Communication circuit 200 includes a base band/MAC (Media Access Control) circuit 250, an RF (Radio Frequency) circuit 205, a balun 204, an antenna 203, EEROMs (Electrically Erasable and Programmable Read Only Memories) 206 and 207, a power supply circuit 201 and a clock circuit 202.

Clock circuit 202 supplies a clock signal to base band/MAC circuit 250 and RF circuit 205. Power supply circuit 201 controls supply of an electric power to base band/MAC circuit 250 and RF circuit 205.

RF circuit 205 transmits and receives data via antenna 203. Balun 204 is arranged between antenna 203 and RF circuit 205.

Base band/MAC circuit 250 includes a CPU 251, an interface 252, an external bus controller 253, a program memory 254, a shared memory 255, a timer 256, a control MAC unit 257, an ADC (Analog-Digital Converter) 258 and a DAC (Digital-Analog Converter) 259.

Interface 252 is employed for host system 100. When CPU 251 receives, from host system 100, an instruction for transmitting data to the network, CPU 251 causes interface 252 to take out the data stored in the memory (e.g., RAM 103) in host system 100. It is noted that host system 100 produces data instructing the transmission, stores this data in the above memory and transmits a transmission instruction for this data to communication circuit 200. The data taken out by interface 252 is temporarily stored in program memory 254 as data that forms a "user data body portion" of a frame to be transmitted to the network.

CPU 251 produces the frame to be transmitted to the network by adding various data including the MAC header and an FCS (Frame Check Sequence) to the data stored in program memory 254, and stores it in program memory 254. Further, CPU 251 sets a flag in shared memory 255 to the effect that the frame was produced. A structure of the Beacon frame that is an example of the frame transmitted to the network will be described below with reference to FIG. 3.

Figure 3:
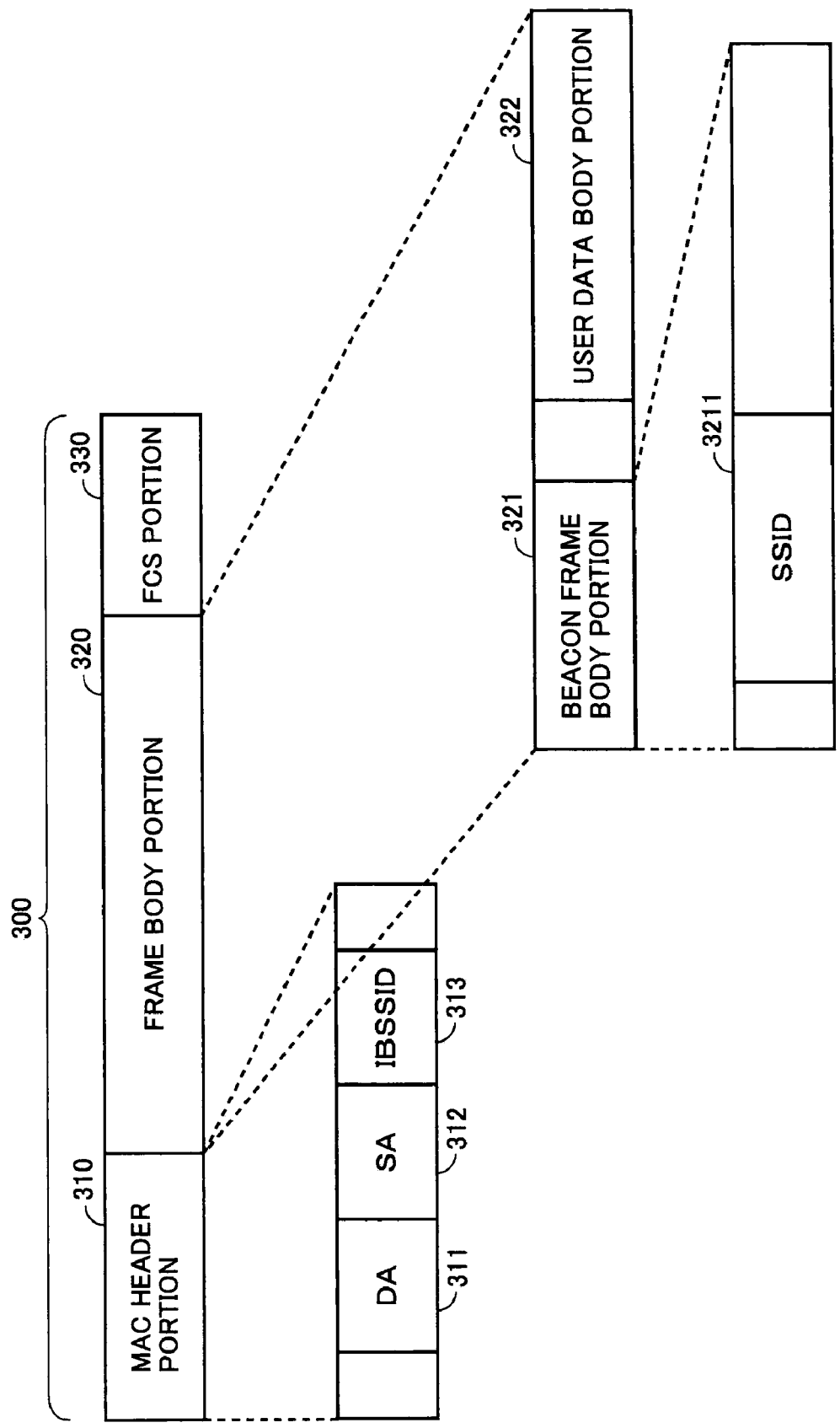
FIG. 3 schematically shows a structure of a frame (Beacon frame) transmitted and received in a network system in FIGS. 1A and 1B.

FIG. 3 shows a structure of the frame conforming to the IEEE (Institute of Electrical and Electronic Engineers) 802.11 standards.

Referring to FIG. 3, a frame 300 includes a MAC header portion 310, a frame body portion 320 and an FCS portion 330.

MAC header portion 310 includes a DA (Destination Address) 311, an SA (Source Address) 312 and an IBSSID 313. DA 311 is a destination address of frame 300. SA 312 is a source or sender address of frame 300. Each of DA 311 and SA 312 is a MAC address of 6 bytes, and is stored in EEPROM 206. IBSSID 313 is network identification information for identifying the ad hoc network. In this embodiment, terminal 1 can selectively use different IBSSIDs in the data transmission operation corresponding to attributes of the data to be transmitted (i.e., the data of which transmission is requested by the application in host system 100). More specifically, IBSSID 313 forming MAC header portion 310 takes a value that changes corresponding to the attribute of the data to be transmitted.

Frame body portion 320 includes a Beacon frame body portion 321 and a user data body portion 322. Beacon frame body portion 321 includes an SSID (Service Set IDentifier). SSID 3211 is, e.g., information specifying a name of the network, and is set as a character string of 32 bytes or less. User data body portion 322 includes practical data to be transmitted (i.e., data of which transmission is requested by the application executed by host system 100). User data body portion 322 includes data, e.g., of 1500 bytes.

Frame 300 in FIG. 3 is the Beacon frame, and therefore frame body portion 320 includes data such a Beacon frame body portion. However, when frame 300 is a frame for another use or purpose, the data included in frame body portion 320 is appropriately changed.

FCS portion 330 includes information (FCS) to be used for detecting an error in the frame.

Returning to FIG. 2, the frame for transmission that is stored in program memory 254 is transmitted by control MAC unit 257 to DAC 259, and is converted into analog data. The data thus converted is transmitted to the network via RF circuit 205, balun 204 and antenna 203.

Communication circuit 200 receives the data transmitted over the network by an operation described below. The frame transmitted to RF circuit 205 over antenna 203 and balun 204 is converted by ADC 258 into digital data, and then is transmitted to control MAC unit 257. Control MAC unit 257 performs frame top detection as well as time and frequency synchronizing processing on the frame converted into the digital signal, and then performs error correction decoding. Further, control MAC unit 257 determines whether DA 311 of this frame matches the MAC address of communication circuit 200 in question stored in EEPROM 206 or not. When they match each other, control MAC unit 257 removes MAC header portion 310 and FCS portion 330 from the frame, and transfers the remaining data (frame body portion 320) to program memory 254. When they do not match each other, control MAC unit 257 abandons the received frame.

When control MAC unit 257 stores received frame body portion 320 in program memory 254, it sets a flag indicating it in shared memory 255. In response to the setting of the flag, CPU 251 transmits frame body portion 320 stored in program memory 254 to host system 100 via interface 252.

The structures of terminals 2-4 in FIGS. 1A and 1B may be substantially the same as that of terminal 1 already described with reference to FIG. 2, and therefore description thereof is not repeated.

Then, description will be given on details of the processing that is executed by host system 100 and communication circuit 200 for the communications to be performed over network 10 of the embodiment.

Figure 4:
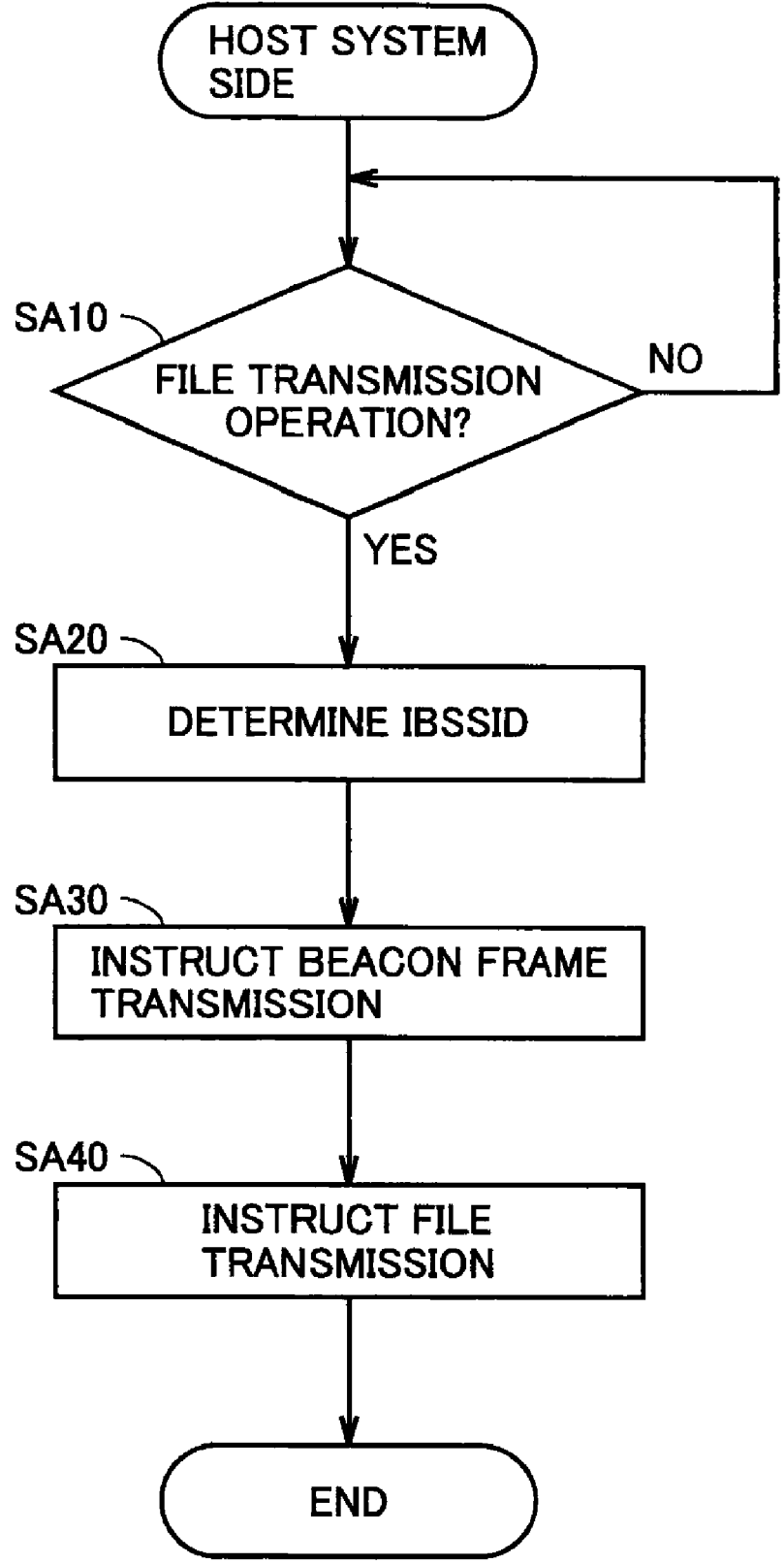
FIG. 4 is a flowchart of processing that is executed on a host system side of the terminal in FIG. 1A or 1B when the network system in FIG. 1A or 1B transmits the frame.
Figure 5:
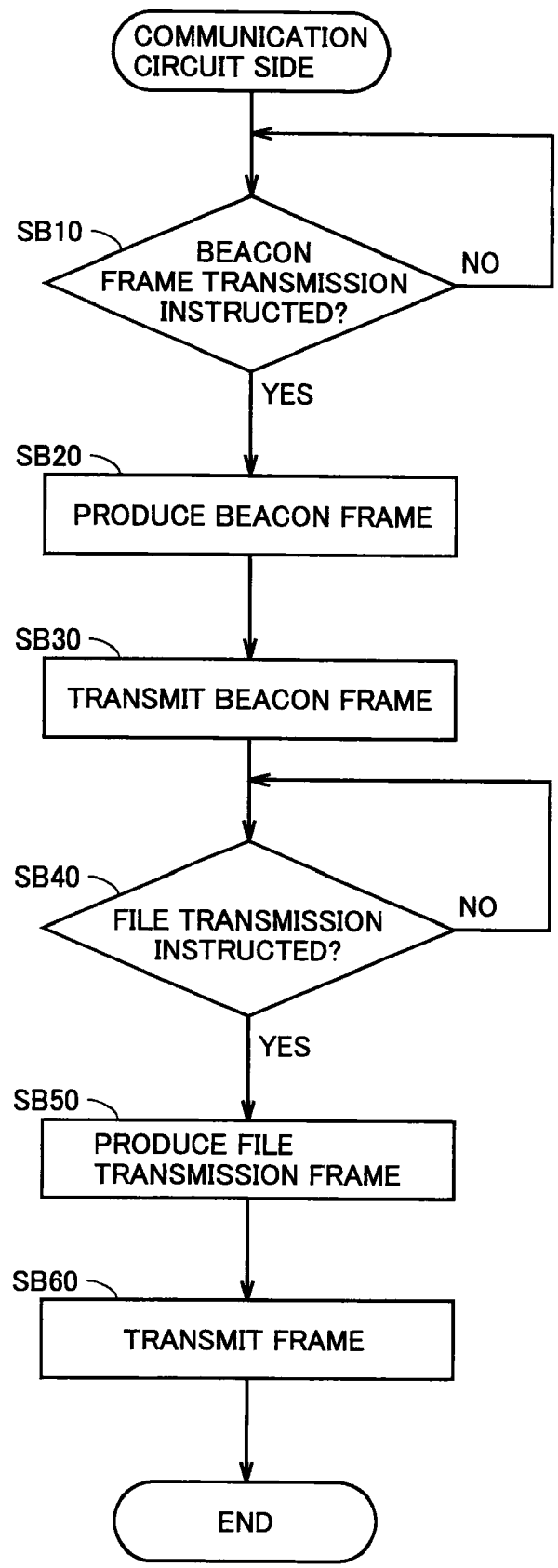
FIG. 5 is a flowchart of the processing executed on a communication circuit side of the terminal in FIG. 1A or 1B when the network system in FIG. 1A or 1B transmits the frame.

FIG. 4 is a flowchart of the processing that is executed by CPU 101 of host system 100 for transmitting data from terminal 1 to network 10. FIG. 5 is a flowchart of the processing executed by CPU 251 of communication circuit 200.

Referring to FIG. 4, CPU 101 determines in step SA10 whether an operation for transmitting a file was performed on input unit 106 or not. When it is determined that the operation was performed, the process proceeds to step SA20.

In step SA20, CPU 101 determines the IBSSID to be used for transmitting this file, and advances the process to step SA30. For example, the following Table 1 is used for determining the IBSSID in step SA20. For example, hard disk 102 stores this table.

TABLE 1

| Application | IBSSID |
|---|---|
| AA | BSS#1 |
| BB | BSS#2 |
| CC | BSS#3 |

Table 1 describes, in a correlated fashion, the applications to be used in host system 100 when host system 100 issues a data transmission request to communication circuit 200 as well as the IBSSID to be used for such data transmission. More specifically, the application specified by "AA" is correlated with the IBSSID specified by "BSS#1", the application specified by "BB" is correlated with the IBSSID specified by "BSS#2" and the application specified by "CC" is correlated with the IBSSID specified by "BSS#3".

In step SA20, CPU 101 determines, as the IBSSID to be used for the file transmission, the IBSSID corresponding to the application that is being executed when the file transmission is instructed in step SA10.

In step SA30, CPU 101 instructs communication circuit 200 to transmit the Beacon frame, and advances the processing to step SA40. In step SA30, CPU 101 transmits information specifying the IBSSID determined in step SA20 to communication circuit 200 together with the above instruction.

Referring to FIG. 5, when host system 100 instructs the transmission of the Beacon frame, CPU 251 in communication circuit 200 advances the processing to step SB10.

In step SB20, CPU 251 produces a Beacon frame based on the IBSSID transmitted by the processing in step SA30 (see FIG. 4), and advances the processing to step SB30. More specifically, in step SB20, CPU 251 produces the Beacon frame by incorporating the information specifying the IBSSID transmitted from host system 100, as IBSSID 313, into the frame already described with reference to FIG. 3.

Then, CPU 251 transmits the Beacon frame produced in step SB20 from antenna 203 in step SB30, and advances the processing to step SB40.

In step SB40, CPU 251 enters and keeps the standby state until it receives the file transmission instruction from host system 100.

Returning to FIG. 4, CPU 101 instructs communication circuit 200 to transmit the Beacon frame in step SA30. Then, CPU 101 stores the file of which operation is accepted in step SA10 in the memory (e.g., RAM 103) of host system 100, and instructs communication circuit 200 to transmit this file. Thereby, CPU 101 ends the processing.

Referring to FIG. 5, when host system 100 instructs the file transmission, CPU 251 advances the processing from step SB40 to step SB50.

In step SB50, CPU 251 produces the frame for file transmission, and advances the processing to step SB60. It is noted that, in step SB50, the data of the file taken out from the memory of host system 100 is inserted, as the data forming user data body portion 322, into the frame already described with reference to FIG. 3, and thereby a file transmission packet (i.e., a packet for file transmission) is produced.

In step SB60, CPU 251 transmits the frame produced in step SB50, and ends the processing.

Figure 6:
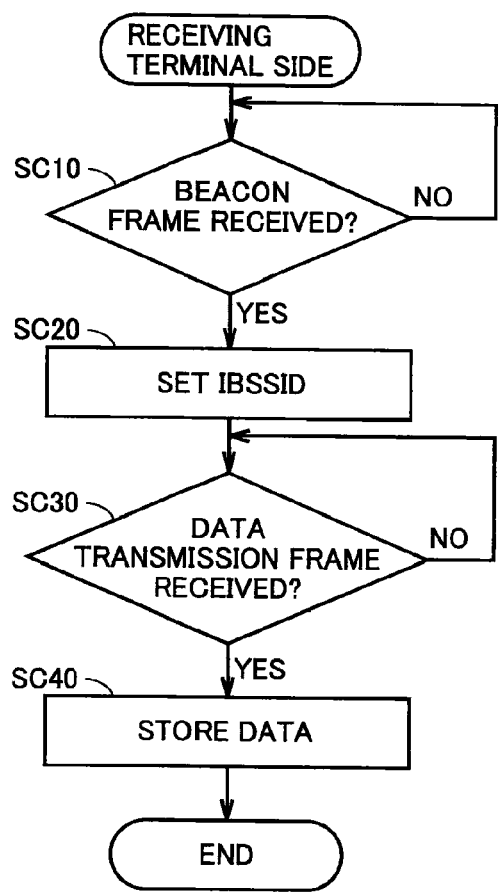
FIG. 6 is a flowchart of the processing executed on the communication circuit side of the terminal in FIG. 1A or 1B when the network system in FIG. 1A or 1B receives the frame.

FIG. 6 is a flowchart of the processing executed by CPU 251 of communication circuit 200 in the terminal (one of terminals 2-4) on the side that receives the frame transmitted in the manner described with reference to FIGS. 4 and 5.

Referring to FIG. 6, CPU 251 determines in step SC10 whether the Beacon frame is received or not, and advances the processing to step SC20 when it is received.

In step SC20, the IBSSID included in the frame of which reception is determined in step SC10 is set by CPU 251 as the IBSSID to be used for the communications, and the process proceeds to step SC30. The Beacon frame received in this stage is the Beacon frame of which transmission is instructed in step SA30 (see FIG. 4), and which is transmitted in step SB30 (see FIG. 5). The setting of the IBSSID means an operation of extracting the data (IBSSID 313 in FIG. 3) specifying the IBSSID from the Beacon frame and storing it in EEPROM 206.

In step SC30, CPU 251 determines whether a packet including the IBSSID that is set in step SC20 is received or not. When it is received, the process proceeds to step SC40.

In step SC40, CPU 251 stores, in program memory 254, the data forming user data body portion 322 of the packet which is determined to be received in step SC30, and transmits the data to host system 100. Then, it ends the processing.

According to the embodiment described above, the plurality of terminals forming network 10 have stored the plurality of IBSSIDs (e.g., BSS#1, BSS#2 and BSS#3) shared among them. When the data transmission is performed between the terminals on this network 10, the IBSSID to be used for the communications is specified according to the type of the application that was used for transmitting the file to be transmitted in the terminal on the transmission side.

The application used for producing the file is an example of the attribute of the file to be transmitted. The information determining the IBSSID to be used for the communications may be another type of information such as a format of the file to be transmitted. When the file format is used, instead of the type of the application, as the attribute of the data used for determining the IBSSID that is used for the communications, a Table 2 is used instead of Table 1 for determining the IBSSID in step SA20.

TABLE 2

| File Format | IBSSID |
|---|---|
| X | BSS#1 |
| Y | BSS#2 |
| Z | BSS#3 |

In Table 2, the file format and the IBSSID are stored in a correlated fashion. "X", "Y" and "Z" indicated as the file format may be extensions of the files, respectively.

Applications "AA", "BB" and "CC" indicated in Table 1 may be applications for fast transfer of the data such as files, applications for stream transfer of a large amount of data such as audio-visual data and/or applications for transfer of a small amount of data such as chat data.

According to the embodiment described above, the table represented as Table 1 (or Table 2) is stored on the host system 100 side, and the IBSSID is determined by the host system 100 side. However, this determination of the IBSSID may be performed on the communication circuit 200 side. In the latter case, the table represented as Table 1 or 2 is stored, e.g., in EEPROM 207, and CPU 251 determines the IBSSID to be used for the communications. When terminal 1 has the above structure, CPUs 101 and 251 perform the processing of which details are shown in FIGS. 7 and 8.

Figure 7:
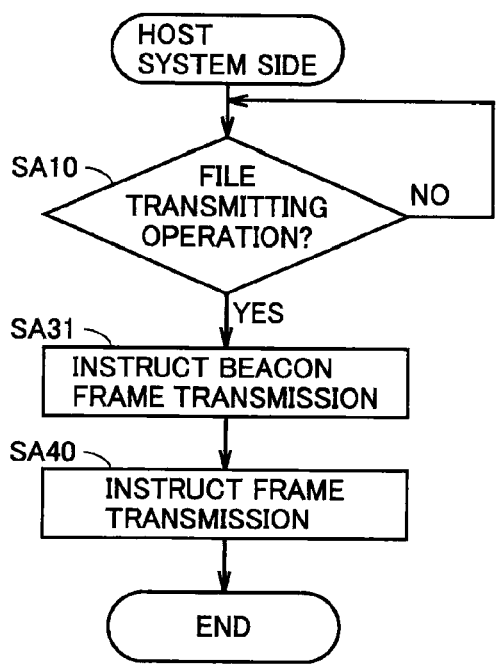
FIG. 7 is a flowchart of a modification of the processing in FIG. 4.
Figure 8:
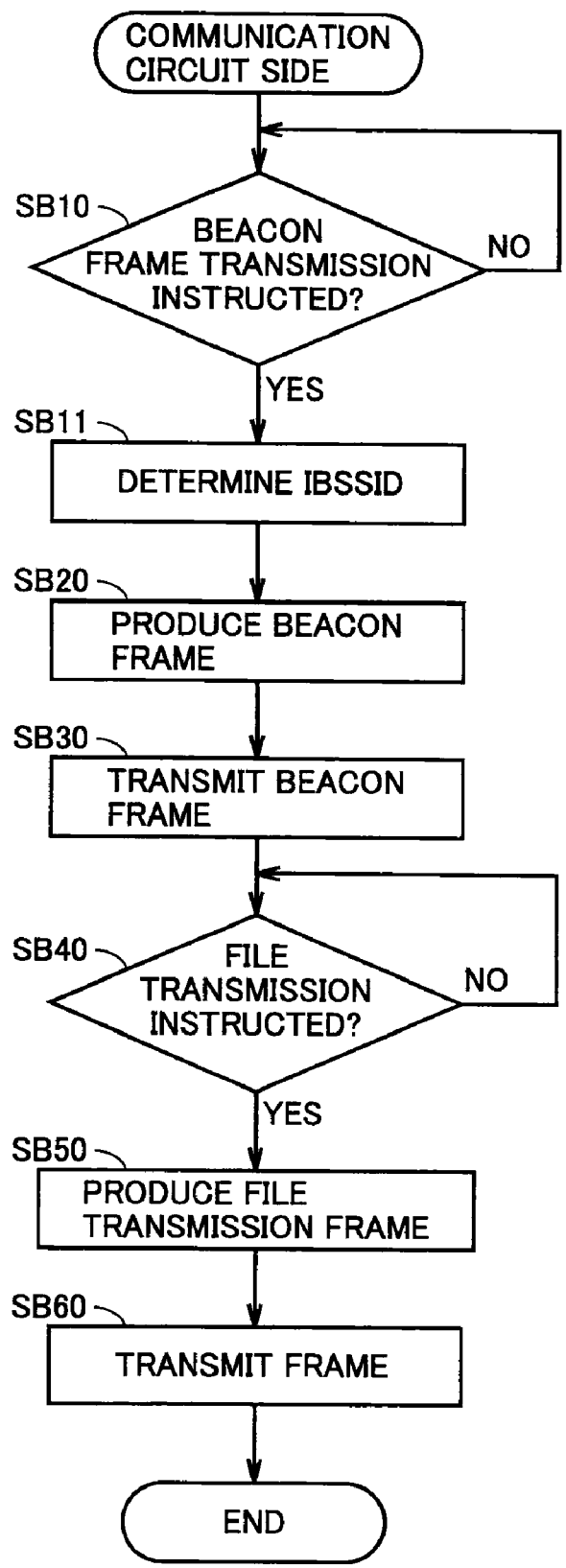
FIG. 8 is a flowchart of a modification of the processing in FIG. 5.

Referring to FIG. 7, when CPU 101 accepts the operation performed through input unit 106, it advances the processing to step SA31.

In step SA31, CPU 101 instructs communication circuit 200 to transmit the Beacon frame, and advances the processing to step SA41.

In step SA31, CPU 101 also transmits, to communication circuit 200, information specifying the application that was used for the file transmission when it accepted the operation for this file transmission in step SA10.

Referring to FIG. 8, when host system 100 instructs the transmission of the Beacon frame in step SA31, CPU 251 advances the processing from step SB10 to step SB11.

In step SB11, CPU 251 refers to Table 1, and determines the IBSSID to be used for the communications based on the information that specifies the application and is transmitted by CPU 101 in steps SA31. Then, CPU 251 advances the processing to step SB20.

In step SB20, CPU 251 produces the Beacon frame, similarly to the processing already described with reference to FIG. 5.

The processing in and after step SB30 in FIG. 8 is substantially the same as that in and after step SB30 in FIG. 5, and therefore description thereof is not repeated.

In the embodiment already described, communication circuit 200 is employed as a practical form of the radio communication apparatus. However, the radio communication apparatus is not practically restricted to this. For example, a part or all of the functions implemented by hardware forming communication circuit 200 may be alternatively implemented by software.

In the radio communication network of the embodiment already described, when an operation is performed in terminal 1 (terminals 1-4) for transmitting a file, host system 100 or communication circuit 200 determines the IBSSID according to the attribute of the file.

In the network described above, terminal 1 (terminals 1-4) may be further configured to determine whether the interruption transmission is to be performed or not, according to the attribute of the file to be transmitted.

In the above case, hard disk 102 further stores information that correlates the attribute of the file with the priority relating to the interruption transmission, as represented in Tables 3 and 4.

TABLE 3

| Interruption Transmission Priority | Application |
|---|---|
| 1 | BB |
| 2 | CC |

TABLE 4

| Interruption Transmission Priority | File Type |
|---|---|
| 1 | X |
| 2 | Z |
| 3 | Y |

Table 3 represents the correlation between the priority relating to the interruption transmission and the type of the application that is employed as the file attribute. Table 4 represents the correlation between the priority relating to the interruption transmission and the file format that is employed as the attribute of the file.

In this case, CPU 101 of host system 100 determines in step SA10 (see FIG. 4) that an operation was performed for the file transmission. In this case, the IBSSID to be used for the file transmission is determined in step SA20, and it is determined whether the communication operation is being performed with respect to another terminal or not. When it is determined that this communication operation is being performed, the file attribute with which the communication operation is being performed is determined, and it is determined whether the priority of this file attribute in Table 3 or 4 is lower than that of the attribute of the file for which the transmission operation was performed at the time of such determination (i.e., in last step SA10), or not. When it is determined that the former priority is lower than the latter, CPU 101 performs the interruption transmission with respect to the communication operation that is being performed, and thereby transmits the file for which the above transmission operation is performed at that point in time.

For example, in a certain case, the stored priority relating to the interruption transmission is correlated with the type of the application as represented in Table 3, and an operation is performed for transmitting the file corresponding to the application of BB (see Table 1) while the communication operation is being performed for the file corresponding to the application of CC or AA (Table 1). In this case, CPU 101 performs the interruption transmission for the file corresponding to the application of the BB. More specifically, CPU 101 redetermines the IBSSID, transmits the Beacon frame using this IBSSID to communication circuit 200 and transmits the file of BB. After the transmission of file of BB ends, CPU 101 restarts the communication operation using the original IBSSID.

In another case, the stored priority relating to the interruption transmission is correlated with the type of the file as represented in Table 4, and the operation of transmitting the file of the type of X or Y is performed while the communication operation for the file of the type of Z (see Table 2) is being performed. In this case, CPU 101 performs the interruption transmission for the file of the type of this X or Y. More specifically, CPU 101 redetermines the IBSSID according to the type of the file to be transmitted by the interruption transmission, transmits the Beacon frame using this IBSSID to communication circuit 200 and transmits the file to be transmitted by the interruption transmission. After the interruption transmission ends, CPU 101 restarts the communication operation using the original IBSSID.

The application and the file type such as BB in Table 3 and X in Table 4 that have the first priority are always transmitted by the interruption transmission when the communications based on the attribute other than those is being performed.

The priorities represented, e.g., in Tables 3 and 4 may be stored for all the applications and the file types to be executed or transmitted by terminal 1, and may also be stored only for a part of such applications and file types.

The priority may be set in advance in terminal 1, or may be set by a user's operation.

CPU 251 of communication circuit 200 may execute the above processing for the interruption transmission. In this case, EEPROM 207 stores the information represented in Table 3 or 4.

When CPU 251 determines in step SB10 (see FIG. 8) that host system 100 instructed the transmission of the Beacon frame, it determines in step SB11 the IBSSID based on the file attribute (the information specifying the application or the type of file) that is transmitted by CPU 101, and determines whether the communications with another terminal are being performed or not. When it is determined that the above communications with another terminal are being performed, CPU 251 determines the file attribute with which the communication operation is being performed, and determines whether the priority of this attribute is lower than that of the file specified by the information received from CPU 101 at this point in time (i.e., in last step SB10) according to Table 3 or 4, or not. When the former is lower than the latter, CPU 251 performs the interruption transmission with respect to the transmission operation that is being performed, and thereby transmits the file for which the transmission operation is performed at this point in time.

[Second Embodiment]

In the first embodiment already described, the IBSSID used for the communications is determined based on the attribute of the file of which transmission on the application is instructed in terminals 1-4. In this embodiment, however, the IBSSID is determined based on details of the SSI) entered by the user through each terminal.

Figure 9:
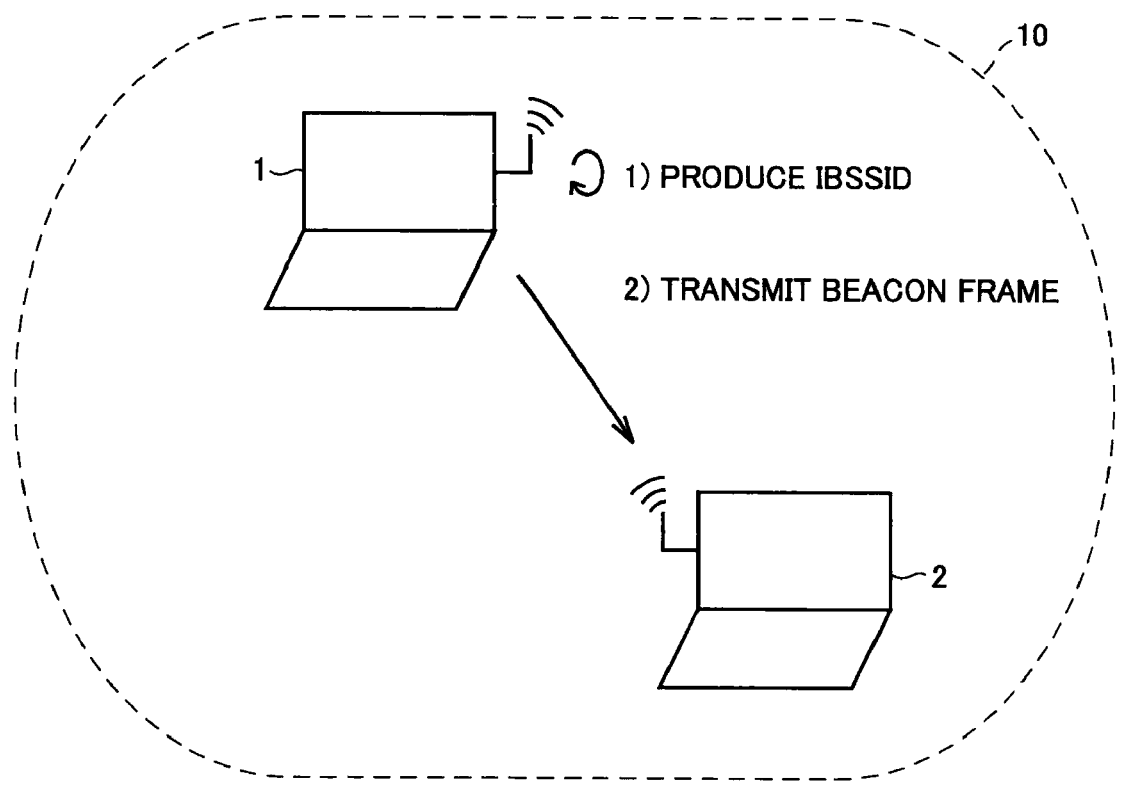
FIG. 9 illustrates transmission and reception of information performed for establishing a connection between terminals in a second embodiment of the radio communication network system of the invention.

FIG. 9 illustrates transmission and reception of information performed for establishing a connection between terminals in a second embodiment of the radio communication network system of the invention.

Referring to FIG. 9, for establishing the connection between terminals 1 and 2 on network 10, the IBSSID is first produced in each of terminals (terminals 1 and 2) on network 10 as indicated by 1). In this embodiment, each terminal performs the same arithmetic on the information (SSID) entered through input unit 106. Thereby, the same IBSSID is produced when the same SSID is entered in each terminal.

As indicated by 2), a certain terminal (terminal 1 in FIG. 9) on network 10 broadcasts the Beacon frame including the IBSSID thus produced. Thereby, the connection is established between terminal 1 that transmitted this Beacon frame and terminal 2 that received the Beacon frame.

Since each of terminals (terminals 1 and 2) forming network 10 of the embodiment can have the hardware structure already described with reference to FIG. 2, description about the hardware structure is not repeated.

Since the structure of the Beacon frame transmitted and received over network 10 of this embodiment may be the same as that already described with reference to FIG. 3, description thereof is not repeated.

Figure 10:
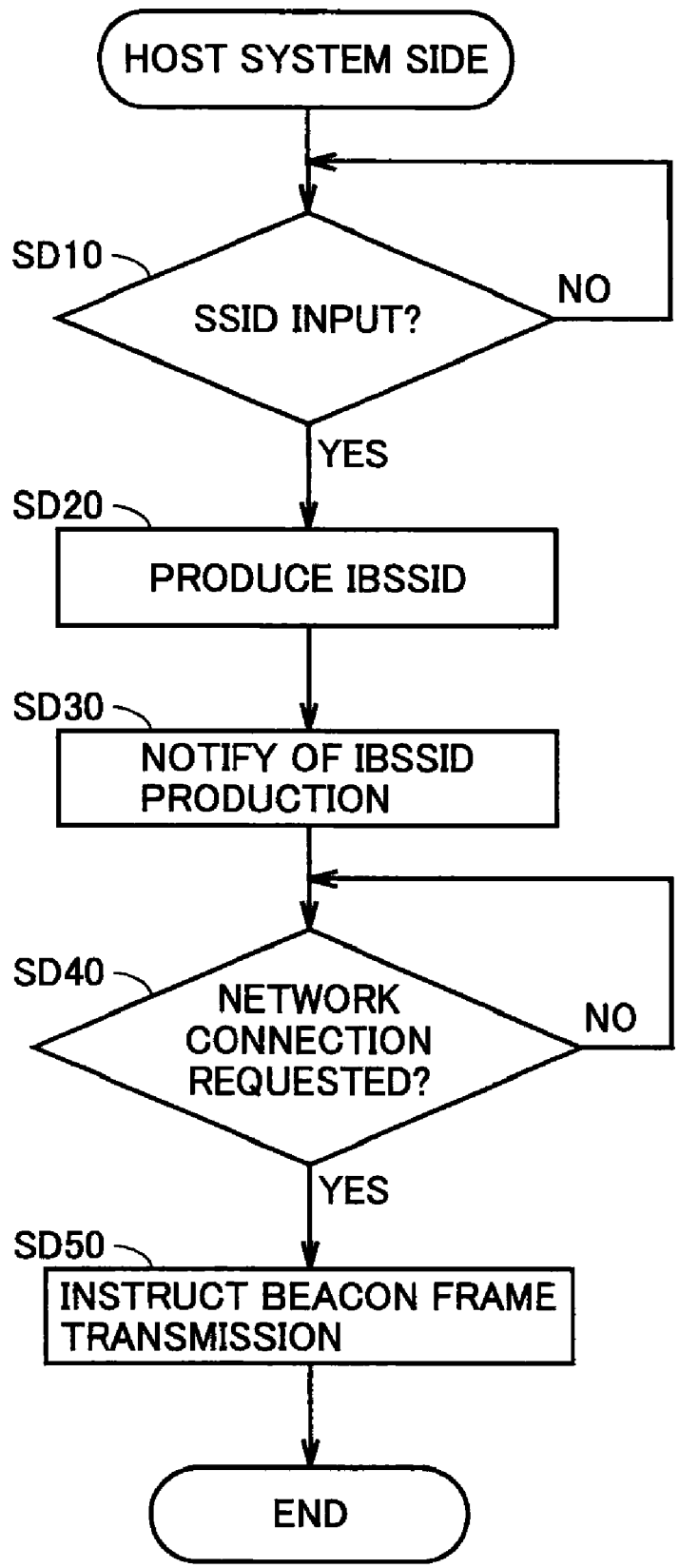
FIG. 10 is a flowchart of the processing executed by a CPU (Central Processing Unit) of a host system of a terminal forming the radio communication network system in FIG. 9.
Figure 11:
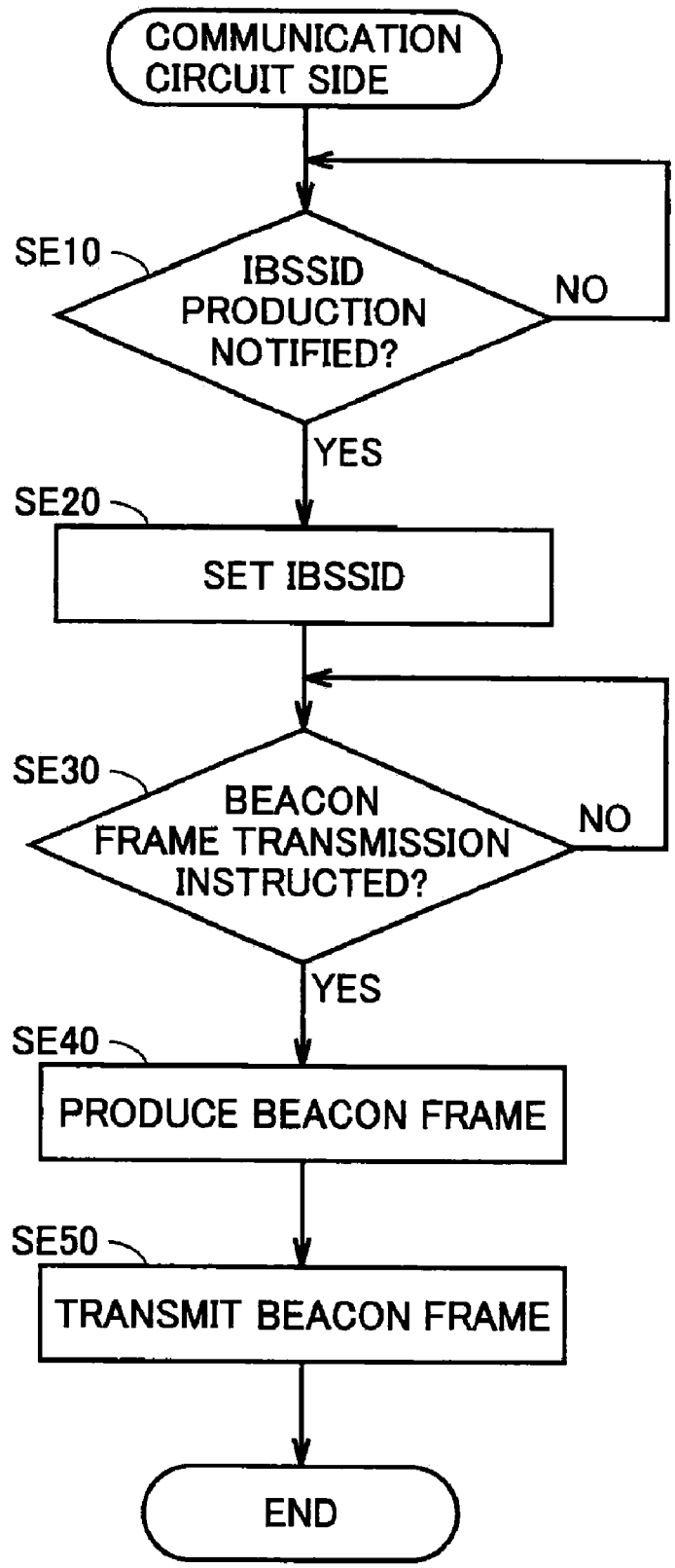
FIG. 11 is a flowchart of processing executed by the CPU of a communication circuit of the terminal forming the radio communication network system in FIG. 9.

Then, description will be given on processing that is executed by the terminal that transmits the Beacon frame when the connection is to be established between the plurality of terminals on network 10 of the embodiment. FIG. 10 is a flowchart of the processing that is executed by CPU 101 of host system 100 of a terminal (that is assumed as terminal 1 for the sake of illustration). FIG. 11 is a flowchart of the processing executed by CPU 251 of communication circuit 200 of this terminal 1.

Referring to FIG. 10, CPU 101 in host system 100 first determines in step SD10 whether the operation of entering the information specifying the SSID is performed on input unit 106 or not. When CPU 101 determines that the above operation is performed, it advances the processing to step SD20.

In step SD20, CPU 101 produces the IBSSID based on the value of entered SSID, and advances the processing to step SD30. In step SD20, CPU 101 accepts the information specifying the SSID entered through input unit 106, and temporarily accepts this information in RAM 103. CPU 101 performs predetermined arithmetic on the information specifying the SSID. The predetermined arithmetic is, e.g., a hash operation, and the program required for executing this arithmetic by CPU 101 is stored on hard disk 102. CPU 101 stores a value obtained as a result of this arithmetic in RAM 103, and advances the processing to step SD30.

In step SD30, CPU 101 notifies communication circuit 200 via interface 107 that the IBSSID is produced and stored in RAM 103, and advances the processing to step SD40.

Referring to FIG. 11, CPU 251 in communication circuit 200 waits for reception of the notification about the production of the IBSSID from host system 100 in step SE10, and will advance the processing to step SE20 upon reception of such notification.

In step SE20, CPU 251 reads the IBSSID produced by host system 100 from RAM 103, stores it in EEPROM 206 and advances the processing to step SE30.

In step SE30, CPU 251 waits for reception of a Beacon frame transmission instruction from host system 100.

Returning to FIG. 10, after the notification about the production of the IBSSID is performed in step SD30, CPU 101 determines in step SD40 whether the information requesting the connection to the network is entered through input unit 106 and the like or not. When this information is entered, CPU advances the processing to step SD50.

In step SD50, CPU 101 transmits the information instructing the transmission of the Beacon frame to communication circuit 200, and ends the processing.

Referring to FIG. 11, when CPU 251 receives the information instructing the transmission of the Beacon frame from host system 100, it advances the processing from step SE30 to step SE40.

In step SE40, CPU 251 produces the Beacon frame, and advances the processing to step SE50. In step SE40, the IBSSID that was stored in EEPROM 206 in step SE20 is set as the IBSSID of the Beacon frame.

In step SE50, CPU 251 broadcasts the Beacon frame produced in step SE40 via antenna 203.

In this embodiment, when the SSID is entered in each terminal that forms network 10, the IBSSID is produced similarly to the manner already described with reference to FIG. 10. This embodiment is configured such that each terminal performs the same arithmetic on the SSID as the others. Therefore, by entering the same value of the SSID in each terminal, the same IBSSID is produced in all the terminals forming network 10.

For improving security in communications over network 10, details of the arithmetic performed on the IBSSID may be changed periodically. In this case, the details of the arithmetic should be changed simultaneously in all the terminals forming network 10.

According to the embodiment described above, each terminal produces the BSSID by arithmetically operating the SSID on the host system 100 side. However, the BSSID may be produced on the communication circuit 200 side in each terminal. When the BSSID is produced on the communication circuit 200 side, CPU 101 of host system 100 executes processing illustrated by a flowchart of FIG. 12, and CPU 251 of communication circuit 200 executes the processing illustrated by a flowchart of FIG. 13.

Figure 12:
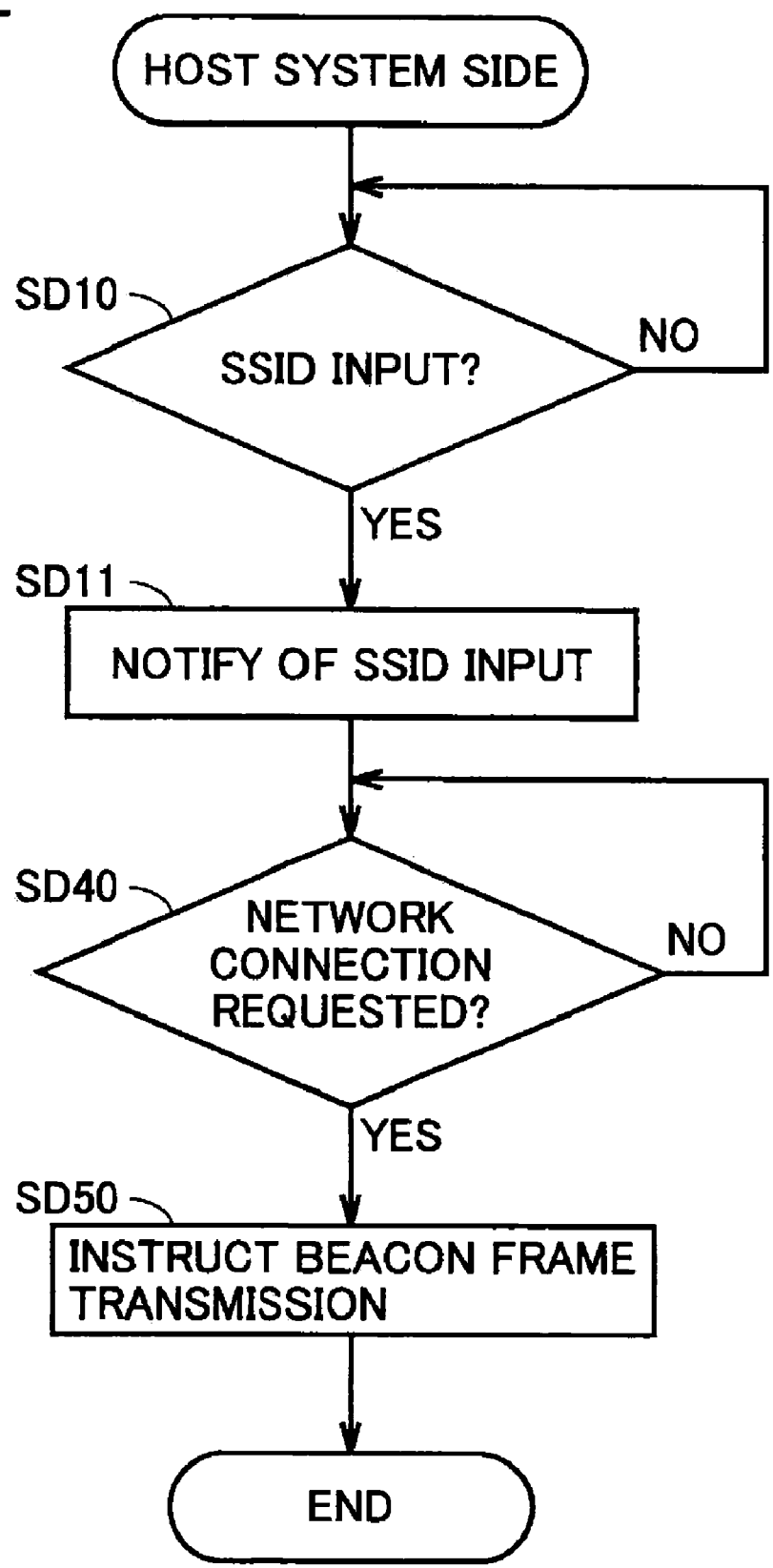
FIG. 12 is a flowchart of a modification of the processing in FIG. 10.

Referring to FIG. 12, when CPU 101 determines in step SD10 that the information specifying the SSID through input unit 106 and the like is entered, it advances the processing to step SD11.

In step SD11, CPU 101 stores this SSID in RAM 103, transmits the information notifying of the input of the SSID to communication circuit 200 via interface 107 and advances the processing to step SD40.

Figure 13:
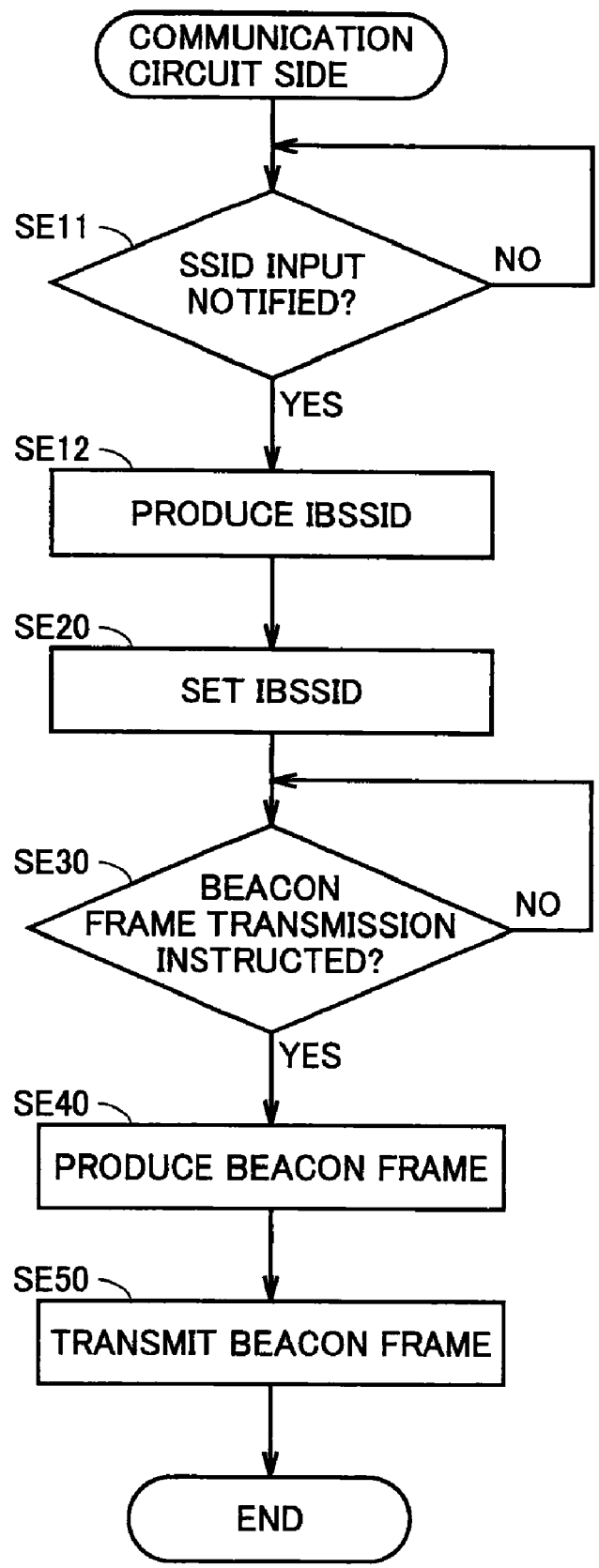
FIG. 13 is a flowchart of a modification of the processing in FIG. 11.

Referring to FIG. 13, CPU 251 waits for reception of notification about the input of SSID from host system 100 in step SE11, and advances the processing from step SE11 to step SE12 upon reception thereof.

In step SE12, CPU 251 reads the SSID stored in RAM 103, and performs predetermined arithmetic on the SSID to produce the IBSSID. This predetermined arithmetic is, e.g., a hash operation, and the program for executing this arithmetic by CPU 251 is stored, e.g., in EEPROM 207.

Then, in step SE20, CPU 251 stores the value of IBSSID produced in step SE12 in EEPROM 206 as the IBSSID to be used for the communications, and then advances the processing to step SE30.

In step SE30, CPU 251 waits for the instruction issued from host system 100 for transmitting the Beacon frame.

Returning to FIG. 12, CPU 101 notifies communication circuit 200 of the input of SSID in step SD11, and then determines in step SD40 whether the information requiring the connection to the network is input through input unit 106 or the like, or not. When the above information is input, the process proceeds to step SD50.

In step SD50, CPU 101 transmits, to communication circuit 200, the information instructing the transmission of the Beacon frame, and ends the processing.

Referring to FIG. 13, when CPU 251 is instructed by host system 100 to transmit the Beacon frame, it advances the processing from step SE30 to step SE40.

In step SE40, CPU 251 produces the Beacon frame, using the value of the IBSSID stored in EEPROM 206, and advances the processing to step SE50.

In step SE50, CPU 251 broadcast the Beacon frame produced in step SE40 via antenna 203, and ends the processing.

[Third Embodiment]

In this embodiment, it is assumed the communications are performed according to the IEEE 802.11 standards that are a kind of standards of the wireless LAN (Local Area Network), and this embodiment provides a system in network 10 shown in FIGS. 1 and 2, and particularly a system that eliminates error checking according to a redundant code indicated by FCS by communication circuit 200 of the terminal on the reception side.

Figure 14:
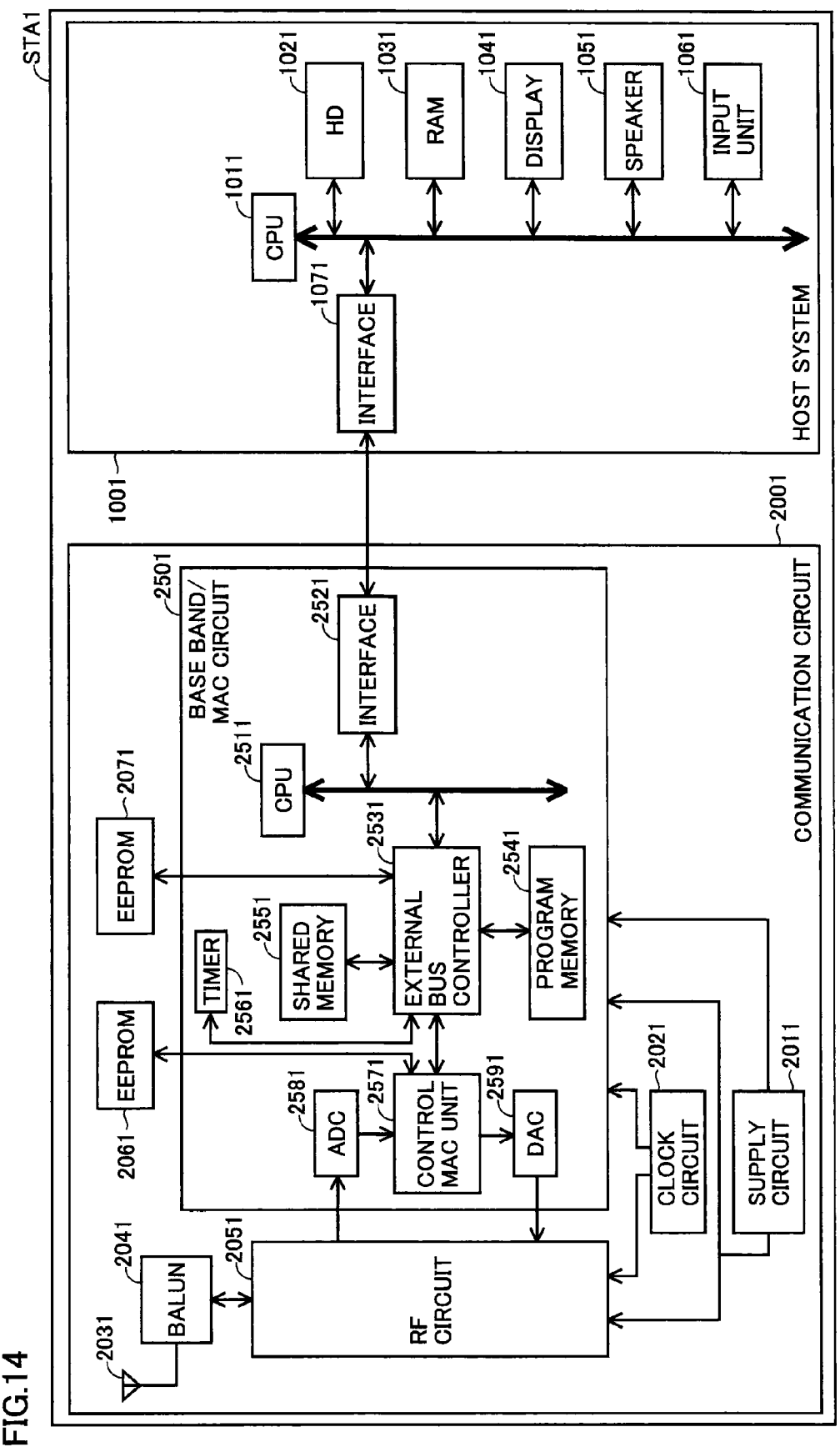
FIGS. 14 and 15 show a structure of a terminal according to a third embodiment.
Figure 15:
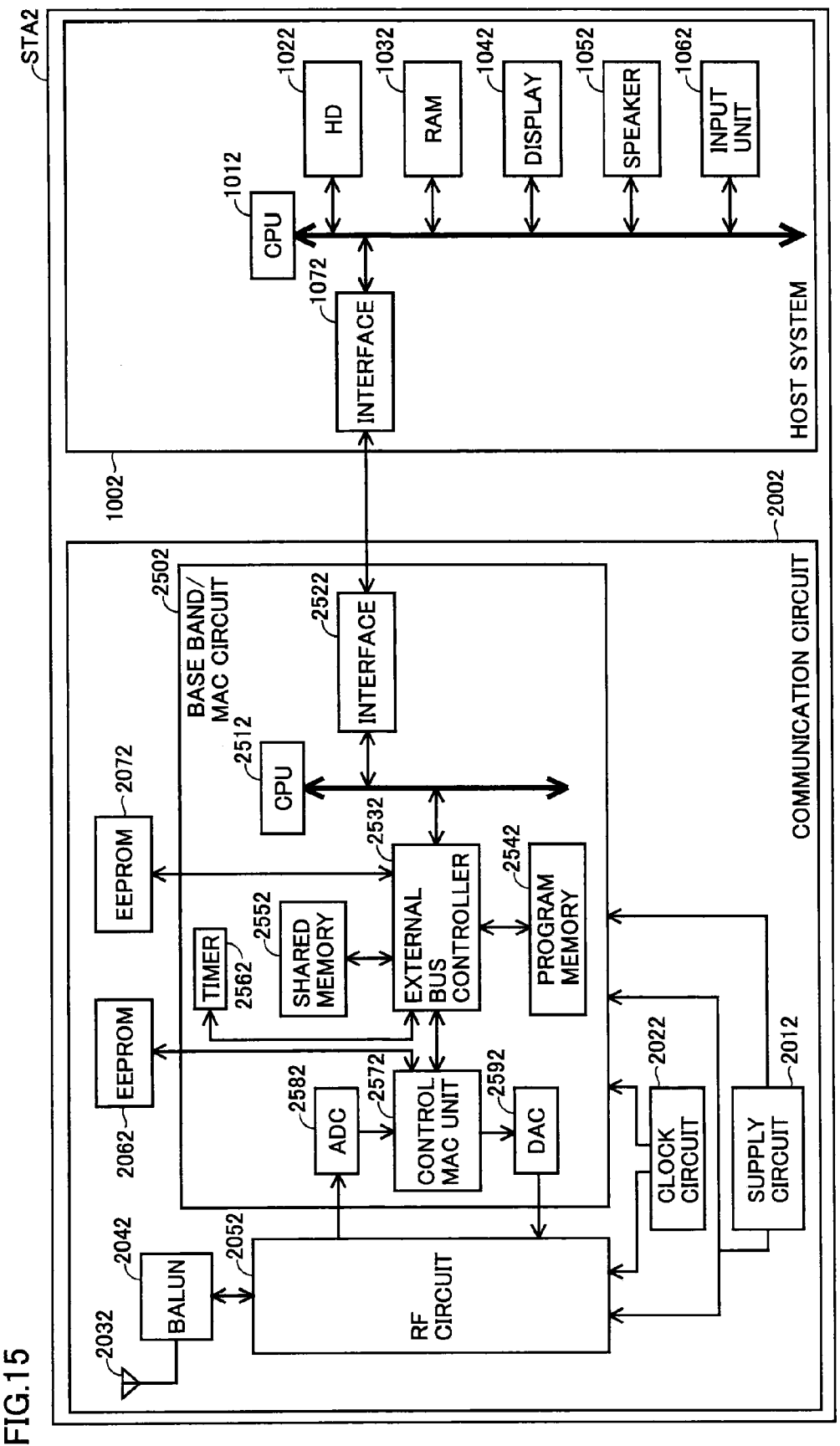

In this embodiment, it is assumed that radio communications are established between terminals STA1 and STA2 forming the same radio cell in network 10. FIGS. 14 and 15 show structures of terminals STA1 and STA2, respectively. The structures in FIGS. 14 and 15 are substantially the same as those of terminal 1 shown in FIG. 2. For distinguish the structures and portions of terminals STA1 and STA2 from each other, each portion of terminal STA1 in FIG. 14 bears a reference number prepared by adding "1" after that of the corresponding portion in FIG. 2, and each portion of terminal STA2 in FIG. 15 bears a reference number prepared by adding "2" after that of the corresponding portion in FIG. 2. Terminal STA1 is formed of a communication circuit 2001 and a host system 1001, and terminal STA2 is formed of a communication circuit 2002 and a host system 1002.

Figure 16:
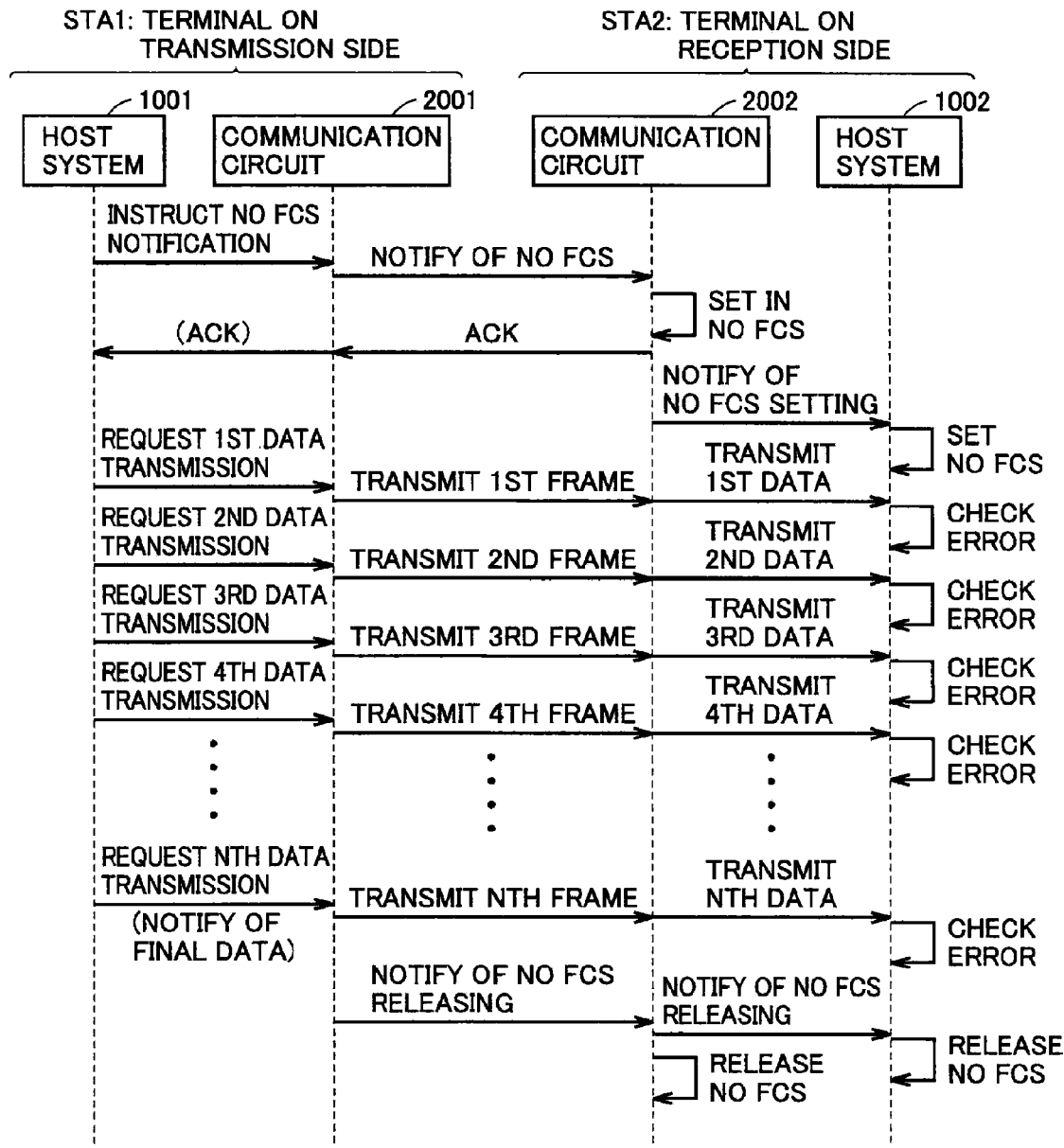
FIG. 16 schematically shows a communication sequence of No FCS according to the third embodiment.
Figure 17:
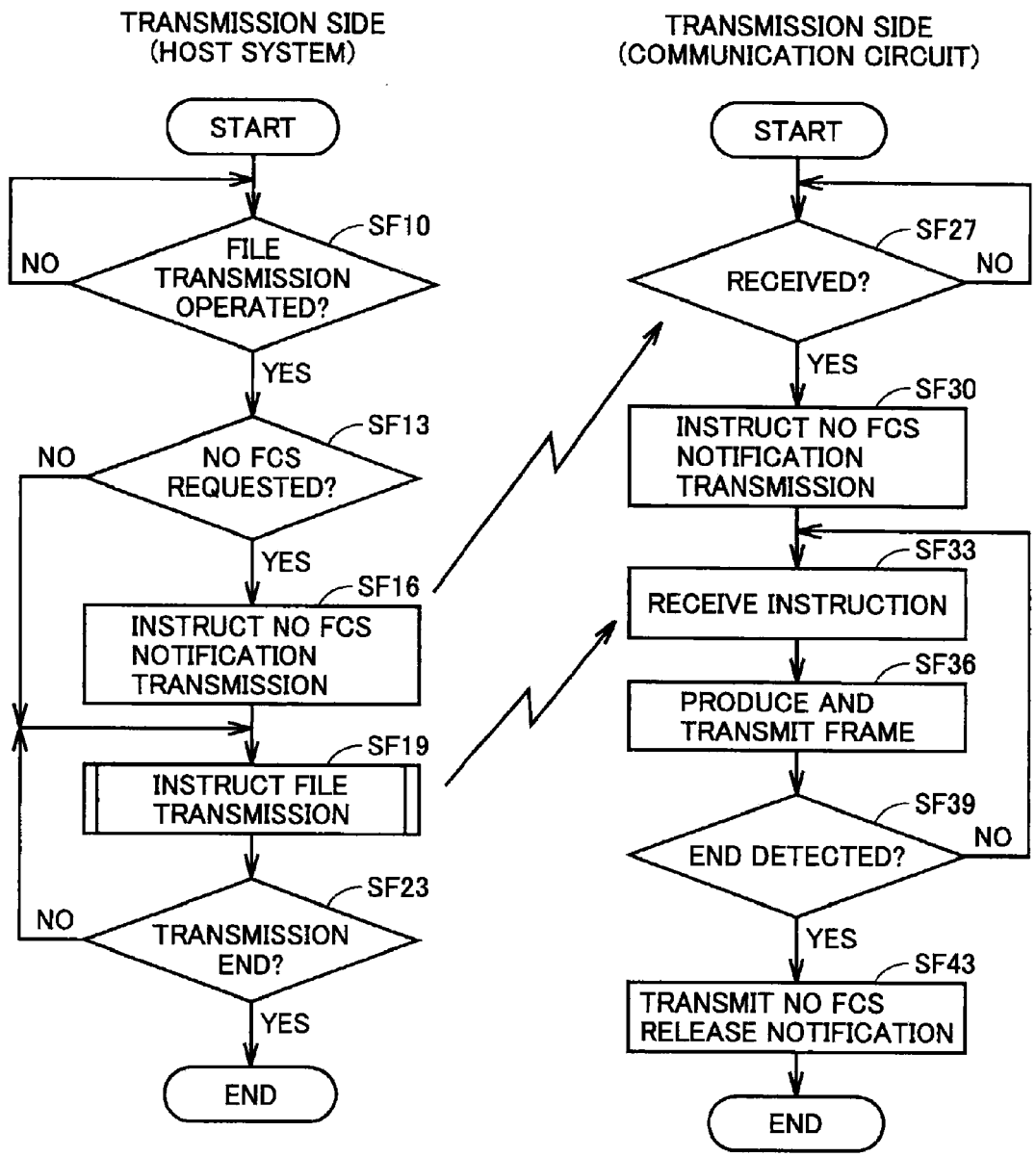
FIGS. 17 and 18 are flowcharts of communication processing according to the third embodiment.
Figure 18:
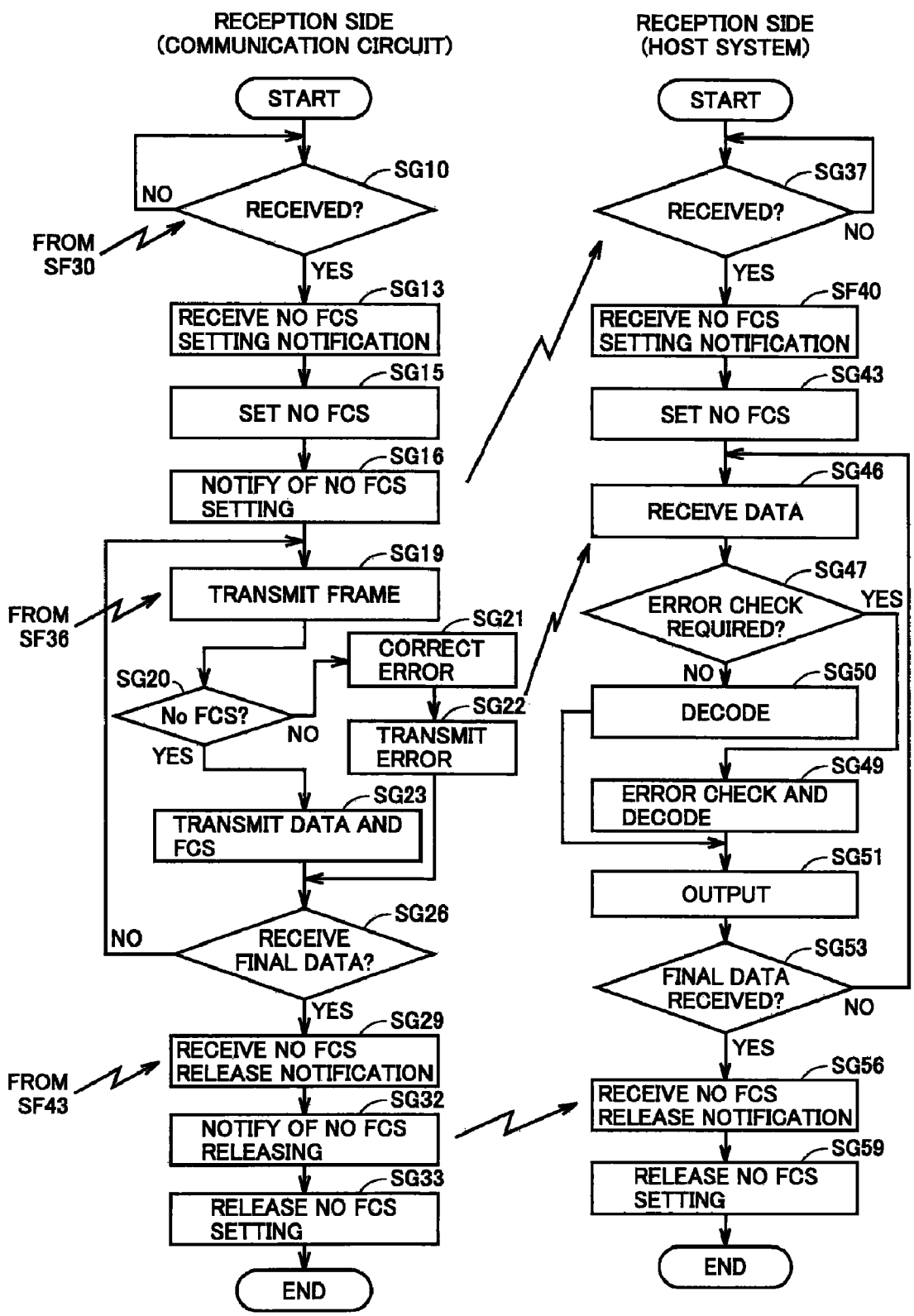
Figure 19:
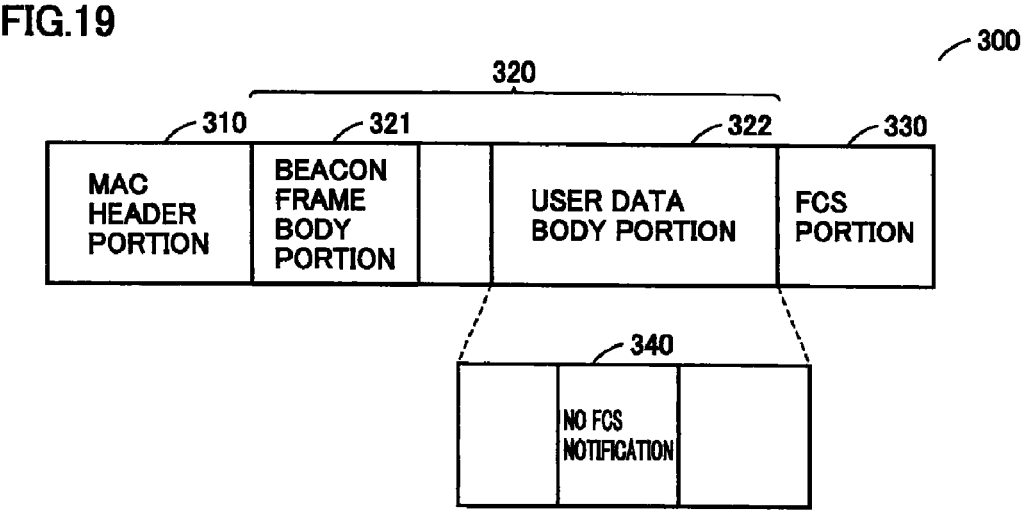
FIGS. 19 and 20 schematically show communication frames according to the third embodiment.
Figure 20:
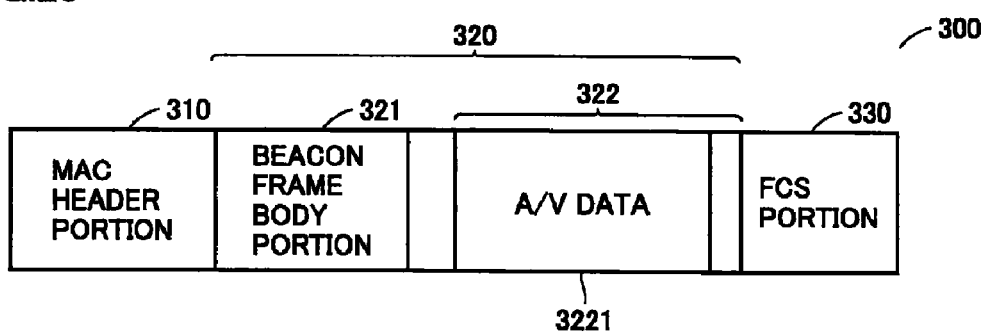
Figure 21:
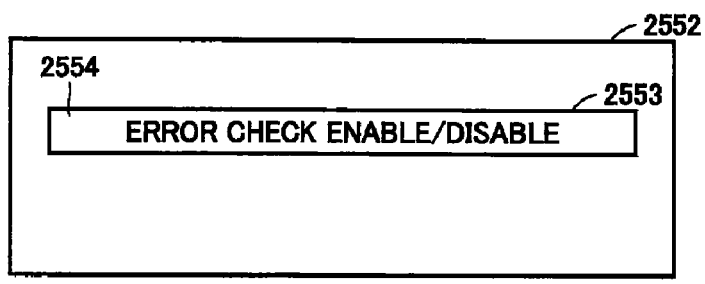
FIG. 21 shows an example of contents of a memory a communication circuit side according to the third embodiment.
Figure 22:
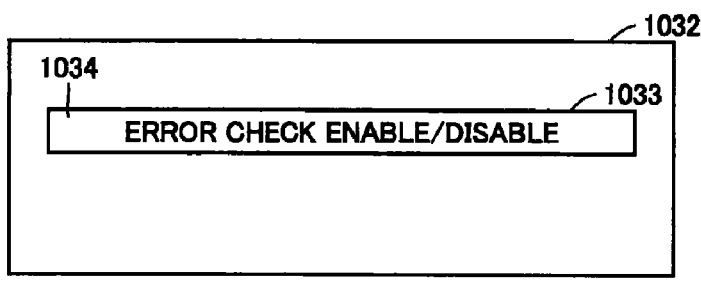
FIG. 22 shows an example of contents of a memory on a host system side according to the third embodiment.

FIG. 16 schematically shows a communication sequence of a method that does not perform error checking according to a redundant code indicated by the FCS according to this embodiment and will be referred to as a "No FCS method" hereinafter. FIGS. 17 and 18 show flowcharts of communication processing according to the third embodiment. FIGS. 19 and 20 schematically shows a structure of a frame (Beacon frame) according to the third embodiment. FIGS. 21 and 22 show an example of contents of the memory according to the third embodiment.

Referring to the sequence of FIG. 16, description will be given on the case where terminals STA1 and STA2 having established a session operate according to the flowcharts of FIGS. 17 and 18 so that a file transmission request occur on the terminal STA1 side and a file is transmitted to terminal STA2.

First, a CPU 1011 of host system 1001 in terminal STA1 on the transmission side determines in step SF10 whether the file transmission operation is performed according to the instruction entered through an input unit 1061 or according to the currently running application (application program), or not. When it is determined the transmission operation is performed, the process proceeds to step SF13.

In step SF13, CPU 1011 determines whether the request in the No FCS method has entered according to the instruction entered through input unit 1061 or according to the currently running application, or not. When the request has entered, CPU 1011 produces the data of the No FCS notification in next step SF16, stores the produced data in a RAM 1031 and transmits the transmission instruction for the stored data to a communication circuit 2001.

In step SF27, a CPU 2511 of communication circuit 2001 receives the transmission instruction in the No FCS method from host system 1001. In step SF30, therefore, communication circuit 2001 produces and transmits the Beacon frame (see FIG. 19) including the No FCS notification read from RAM 1031, similarly to the first embodiment.

In a communication circuit 2002 of receiving-side terminal STA2, Beacon frame 300 in FIG. 19 is received in steps SG10 and SG13 similarly to the first embodiment, and is provided to a control MAC 2572. Beacon frame 300 in FIG. 19 has user data body portion 322 containing an No FCS notification 340.

In step SG15, control MAC unit 2572 receives Beacon frame 300 in FIG. 19 that is converted into a digital signal, performs frame top detection as well as time and frequency synchronizing processing on the received Beacon frame 300 and then detects that the No FCS notification 340 is included. Thereby, control MAC unit 2572 writes and sets data 2554 in a predetermined area 2553 of a shared memory 2552.

More specifically, as shown in FIG. 21, data 2554 in predetermined area 2553 is usually set to enable error check and thus to instruct execution of the FCS error check, i.e., error correction decoding, but is set (i.e., updated) to instruct non-execution of the FCS error check (to disable error check) by control MAC unit 2572.

Thereafter, a CPU 2512 reads data 2554 from shared memory 2552 and notifies host system 1002 of it in step SG16.

When a CPU 1012 in host system 1002 receives data 2554 from communication circuit 2002 in steps SG37 and SG40, it rewrites (i.e., updates) data 1034 in a predetermined area 1033 of RAM 1031 shown in FIG. 22 with the received data in step SG43.

Data 1034 in predetermined area 1033 is usually set to instruct execution of the FCS error check (error correction decoding), i.e., to enable the error checking. However, when data 1034 is updated with data 2554 provided from communication circuit 2002, it is set and updated to instruct nonexecution of the FCS error check, i.e., to disable error check.

Then, the processing starts to transmit the file of which transmission is required. It is now assumed that the file is a file of A/V data requiring real-time processing.

In terminal STA1, the data of the transmission file is divided in advance into predetermined sizes. In steps SF19 and SF23, respective data items (A/V data) prepared by the division are successively provided to communication circuit 200 together with the file transmission instruction until it is determined that the transmission of all the data is completed.

Until all the data of the file is transmitted to terminal STA2 by the steps SF33, SF36 and SF39, communication circuit 2001 produces Beacon frame 300 having user data body portion 322 formed of data 3221 which is input together with the file transmission instruction, and transmits Beacon frame 300 to network 10 every time the file transmission instruction is input from communication circuit 2001.

When communication circuit 2001 determines from the notification provided from host system 1001 that the file transmission ends, communication circuit 2001 produces Beacon frame 300 in FIG. 19 that has data 340 formed of the "No FCS Disable Notification" in step SF43, and transmits it to network 10.

In terminal STA2 on the reception side, communication circuit 2002 repeats the reception of Beacon frame 300 in FIG. 20 from terminal STA1 in steps SG19-SG26 until the file transmission is completed. Beacon frame 300 in FIG. 20 includes, in user data body portion 322, A/V data 3221 forming the file data to be transmitted.

In this operation, control MAC unit 2572 performs the following processing based on data 2554 in shared memory 2552 in steps SG20, SG21, SG22 and SG23 in response to every reception of Beacon frame 300.

First, in step SG20, when it is determined with reference to data 2554 in shared memory 2552 that the error check enable is indicated (NO in step SG20), the FCS error check (error correction decoding) is performed on the received data (A/V data 3221) in steps SG21 and SG22 using the redundant code of FCS portion 330 that is simultaneously received, and A/V data 3221 thus decoded is transmitted to host system 1002. Conversely, when it is determined in step SG20 that data 2554 in shared memory 2552 indicates the error check enable (YES in step SG20), the FCS error check is omitted, and the data (A/V data 3221) received in step SG23 and the redundant code of FCS portion 330 are transmitted to host system 1002.

In host system 1002, CPU 1012 repeats the following processing until the last data is received from communication circuit 2002 in steps SG46-SG53.

Thus, every time the data is received from communication circuit 2002, data 1034 in a RAM 1032 is referred to in step SG47, and it is determined whether the "error check enable" is to be instructed or not. When it is determined that the "error check enable" is to be instructed (YES in step SG47), the error correction decoding is performed on the received data (A/V data 3221) using the redundant code of FCS portion 330 that is simultaneously received in step SG49, and a speaker 1052 and/or a display 1042 output sounds and/or pictures according to decoded A/V data 3221 in step SG51.

When it is determined that data 1034 read from RAM 1032 instructs the "error check disable" (NO in step SG47), the received data (A/V data 3221) received from communication circuit 2002 is decoded as it is (i.e., without performing the error correction), and speaker 1052 and/or display 1042 output sounds and/or pictures according to A/V data 3221 thus decoded.

When information indicating that this is the last data is added to the received data, i.e., A/V data 3221, CPU 1012 determines that the last data has been received, based on the information thus added in step SG53 (YES in step SG53), and the process proceeds to step SG56.

In step SG29, control MAC unit 2572 in communication circuit 2002 receives, over network 10, Beacon frame 300 formed of data 340 that is formed by replacing user data body portion 322 in FIG. 19 with the "No FCS notification" to instruct "No FCS disable notification", and transmits the notification thus received to host system 1002 in step SG32. Thereafter, data 2554 in predetermined area 2553 of shared memory 2552 is updated to replace it with the ordinary data in step SG33. Thus, data 2554 is updated to instruct the "error check enable". When data 2554 indicates the "error check enable", the updating is not performed.

In host system 1002, when CPU 1012 receives the "No FCS disable notification" from communication circuit 2002 in step SG56, it updates data 1034 in predetermined area 1033 of RAM 1032 and returns the normal data into it in step SG59. Thus, data 1034 is updated to instruct the "error check enable". When data 1034 indicates the "error check enable", the updating is not performed.

In this embodiment, the presence/absence of the No FCS setting is determined for every received frame in steps SG20 and SG47 in FIG. 18. As shown in FIG. 16, however, when the data for the No FCS setting that is once set does not change during a period from the start of the file transmission to the end thereof, the presence/absence of the No FCS setting may be performed only at the start of the file reception instead of performing it in response to every frame reception.

According to the embodiment, communication circuit 2001 (2002) does not perform the error correction decoding using the redundant code according to the FCS, but host system 1001 (1002) in a latter stage performs it. Thus, the No FCS method is employed. Thereby, the frame communication from which the error check processing is eliminated can be performed. Thereby, according to the data required by the application that is executed by host system 1001 (1002), i.e., according to whether the data requires real-time communications or not, input unit 1061 (1062) can be operated appropriately to select the manner in which the No FCS method is set and the manner in which it is not set. Thereby, precise streaming reproduction without data dropout can be performed on the host system 1001 (1002) side that execute the application program, e.g., reproducing non-compressed A/V data.

[Fourth Embodiment]

This embodiment is related to the case where the communications are performed according to the IEEE 802.11 standards that are a kind of the wireless LAN (Local Area Network) standards, and provides the method called "intermittent transmission-reception ad hoc mode" as the communication method for achieving low power consumption of the terminals on the wireless LAN ad hoc network in the above case. In this embodiment, it is assumed that two terminals STA1 and STA2 form the same radio cell, and a terminal STA3 is also present. Since terminals STA1 and STA2 have the structures shown in FIGS. 14 and 15, description of specific structures thereof is not repeated. Terminal STA3 has substantially the same structure as that shown in FIG. 2.

Figure 23:
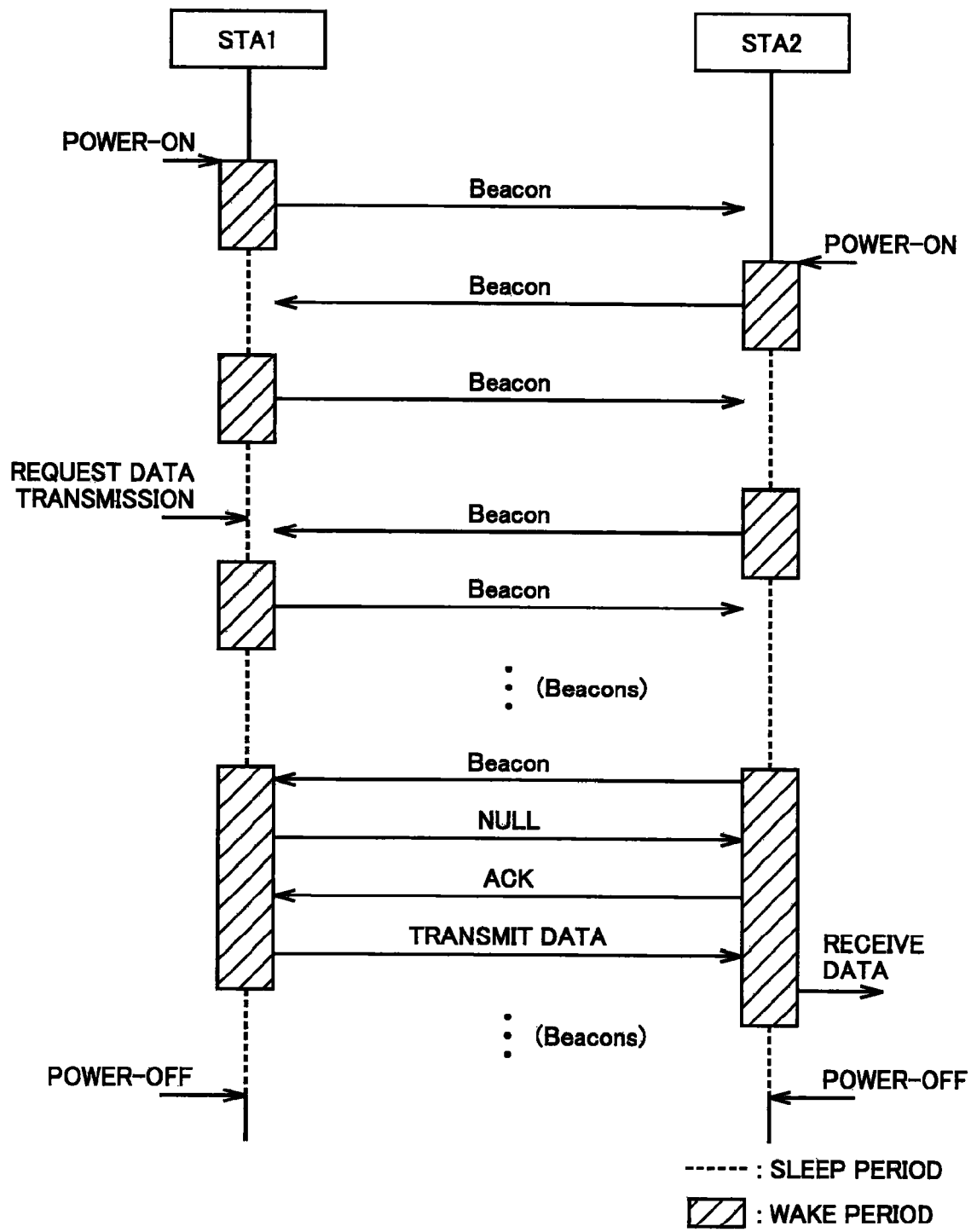
FIG. 23 schematically shows a sequence of an intermittent transmission-reception ad hoc mode according to a fourth embodiment.

FIG. 23 schematically shows a sequence of the intermittent transmission-reception ad hoc mode according to the embodiment. The intermittent transmission-reception ad hoc mode indicates the mode in which communication circuit 200 intermittently performs transmission and reception operations during a period for which the transmission and reception of data is allowed after power supply circuit 201 is turned on to supply the power to various portions and before power supply circuit 201 is subsequently turned off to interrupt the power supply to the respective portions. Therefore, during a period (called "reception standby period") between the power-on and the subsequent power-off, communication circuit 200 alternately repeats a sleep period represented by broken line in FIG. 23 and a wake period hatched in FIG. 23, and the transmission and reception are allowed during the wake period.

In the wake period, clock circuit 202 supplies a clock to various portions of communication circuit 200. While the clock is being supplied, each portion operates with the power received from power supply circuit 201 so that each portion consumes the electric power during this state. The data can be transmitted and received during this state.

For transition from the wake period to the sleep period, CPU 251 provides an off instruction for turning off clock circuit 202. When clock circuit 202 receives the off instruction, it stops output of the clock to various portions except for timer 256. Thereby, various portions of communication circuit 200 except for timer 256 are no longer supplied with the clock. Each portion cannot operate (i.e., is at rest) while the clock is not supplied. Since the various portions stop the operation, the data transmission and reception are impossible during the sleep period. However, various portions except for timer 256 do not consume the power so that the power consumption can be small.

During the sleep period, timer 256 measures the time, and will provide an turn-on instruction to clock circuit 202 when it measures a certain sleep period. When clock circuit 202 receives the turn-on instruction, it resumes outputting of the clock to various portions of communication circuit 200. Thereby, the various portions resume the operations to consume the power again. In this manner, the transition from the sleep period to the wake period takes place.

During the wake period, when CPU 251 senses elapsing of the certain wake period based on the measured value provided from timer 256, CPU 251 provides the turn-off instruction to clock circuit 202. Thereby, communication circuit 200 changes from the wake period to the sleep period.

Figure 24A:
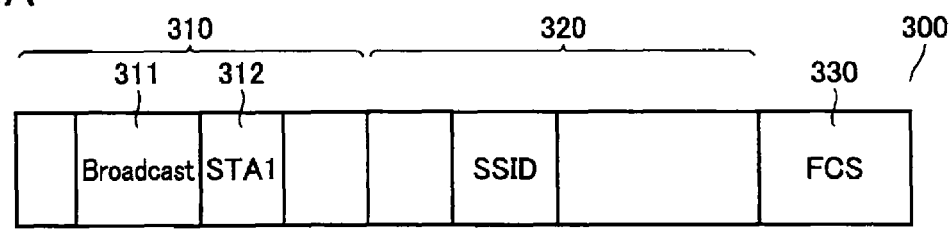
FIGS. 24A-24D show an example of a frame according to the fourth embodiment.

Referring to FIG. 23, when both terminals STA1 and STA2 are powered off, these enter the wake period and transmit Beacon frame 300. Beacon frame 300 transmitted from terminal STA1 has a format shown in FIG. 24A. Beacon frame 300 transmitted from terminal STA2 has a format shown in FIG. 24B. DAs 311 of these Beacon frames 300 represent the destinations according to the broadcast.

Figure 24B:
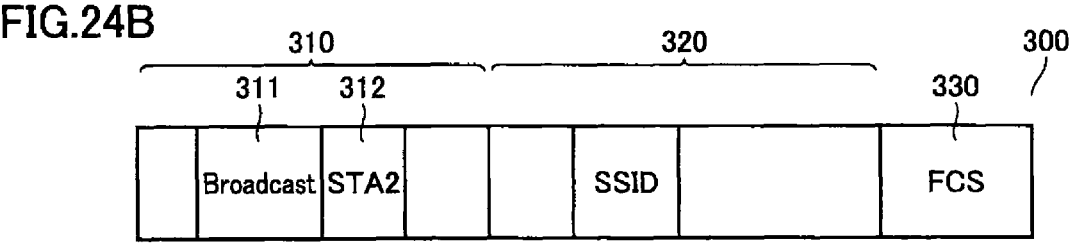
Figure 24C:
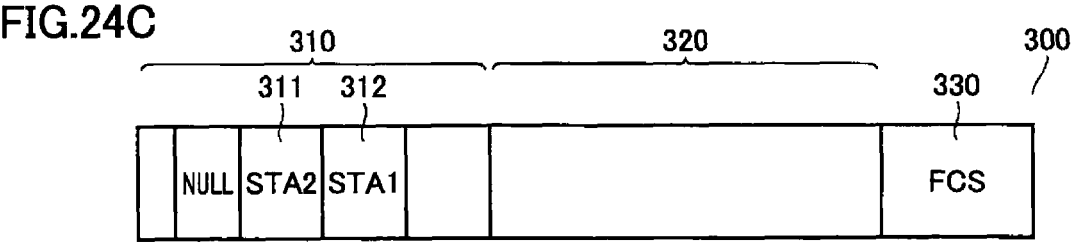
Figure 24D:
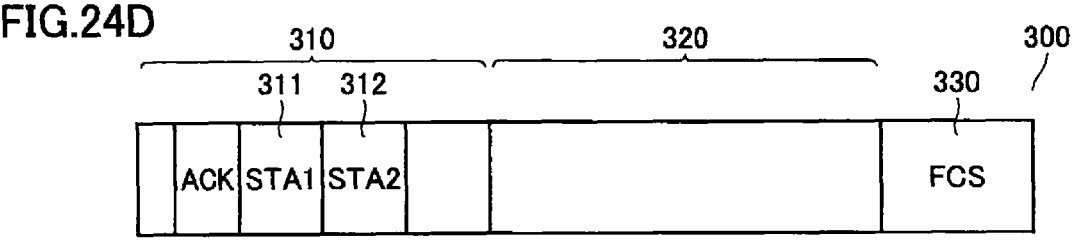

Referring to FIG. 23, when terminal STA1 is in the fourth wake period after the power-on, terminal STA1 can receive Beacon frame 300 in FIG. 24B that is transmitted from terminal STA2 that has entered the third wake period. In response to this reception, therefore, terminal STA1 transmits Beacon frame 300 (see FIG. 24C) having NULL of acknowledge response in MAC header portion 310 to terminal STA2. In response to the reception of Beacon frame 300 of NULL, terminal STA1 transmits Beacon frame 300 (see FIG. 24D) having an ACK response in MAC header portion 310 to terminal STA2. Thereby, session is established between terminals STA1 and STA2, i.e., both the communication parties confirm each other and enter the state allowing the communications between them. Thereby, terminal STA1 transmits, to terminal STA2, a frame of data according to the data transmission request already received from host system 1001 side.

Figure 25:
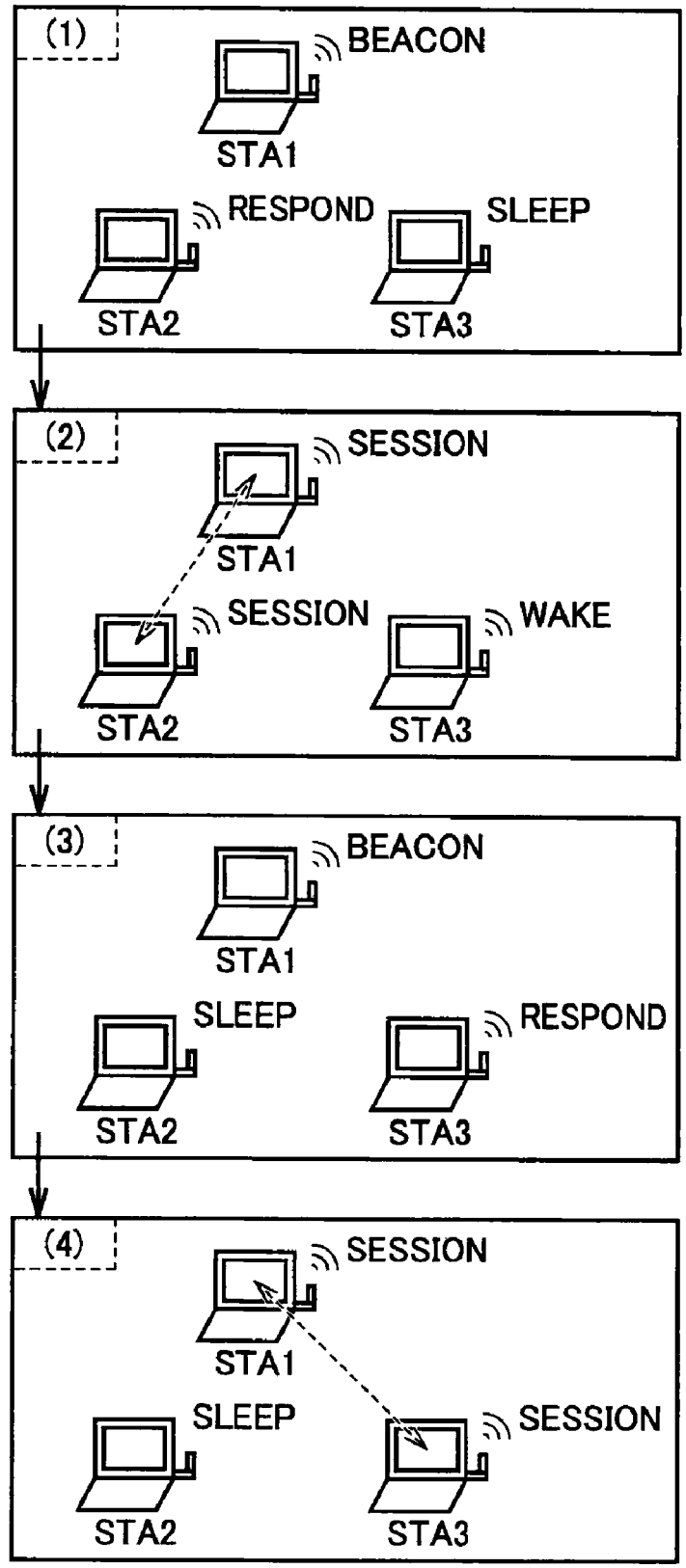
FIG. 25 schematically illustrates a communication procedure in the intermittent transmission-reception ad hoc mode according to the fourth embodiment.
Figure 26:
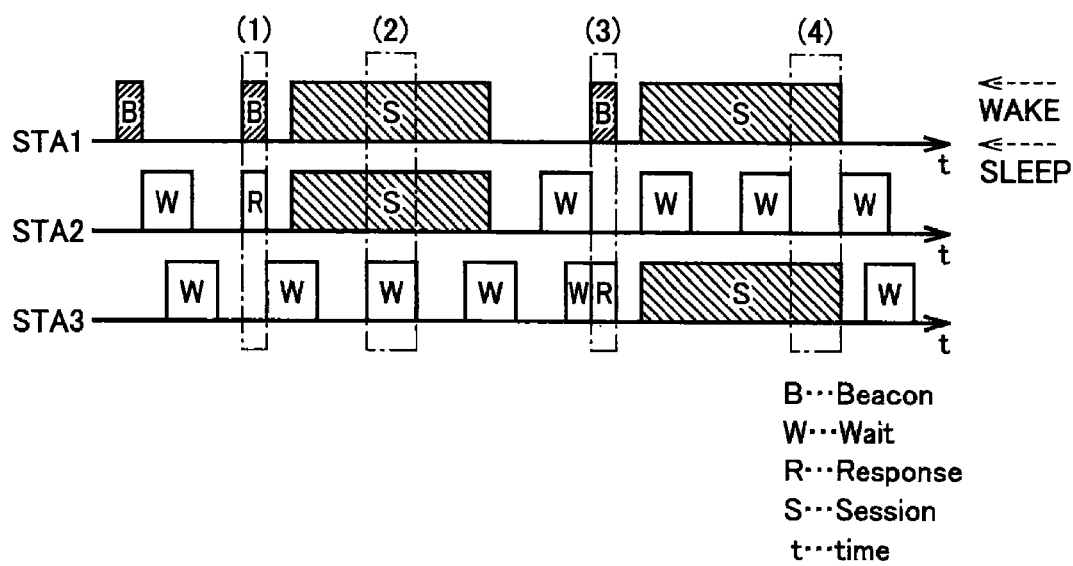
FIG. 26 schematically illustrates the communication procedure in the intermittent transmission-reception ad hoc mode according to the fourth embodiment.

FIGS. 25 and 26 schematically shows the case where the intermittent transmission-reception ad hoc mode is employed, and terminals STA1, STA2 and STA3 that are on standby periodically enter the sleep state to reduce the standby power (i.e., the power consumed during the standby state). In a state (1) in FIG. 25, terminal STA3 is in the sleep period, but terminal STA2 in the wake state receives Beacon frame 300 transmitted from terminal STA1 in the wake period, and provides a response to it. Thereafter, terminals STA1 and STA2 establish the session between them to perform the data communications (see FIG. 26). Thus, a state (2) in FIG. 25 is attained. During the data communications, terminal STA3 that is present in the same radio cell operates to reduce the power consumption by alternately repeating the wake period and the sleep period.

In the state (2), terminal STA3 that is present in the same radio cell as terminals STA1 and STA2 is in the wake period while terminals STA1 and STA2 are performing the data communications.

When the data communications end, the terminals enter a state (3). In the state (3), terminal STA3 in the wake period receives Beacon frame 300 transmitted from terminal STA1 (terminal STA2 is in the sleep period). Thereby, the response is transmitted and received between terminals STA1 and STA2 as shown in FIG. 26, and the session is established so that the data communications in a state (4) are performed. During this data communication period, terminal STA2 that is present in the same radio cell alternately repeats the wake period and the sleep period, and thus operates to reduce the power consumption.

Figure 27:
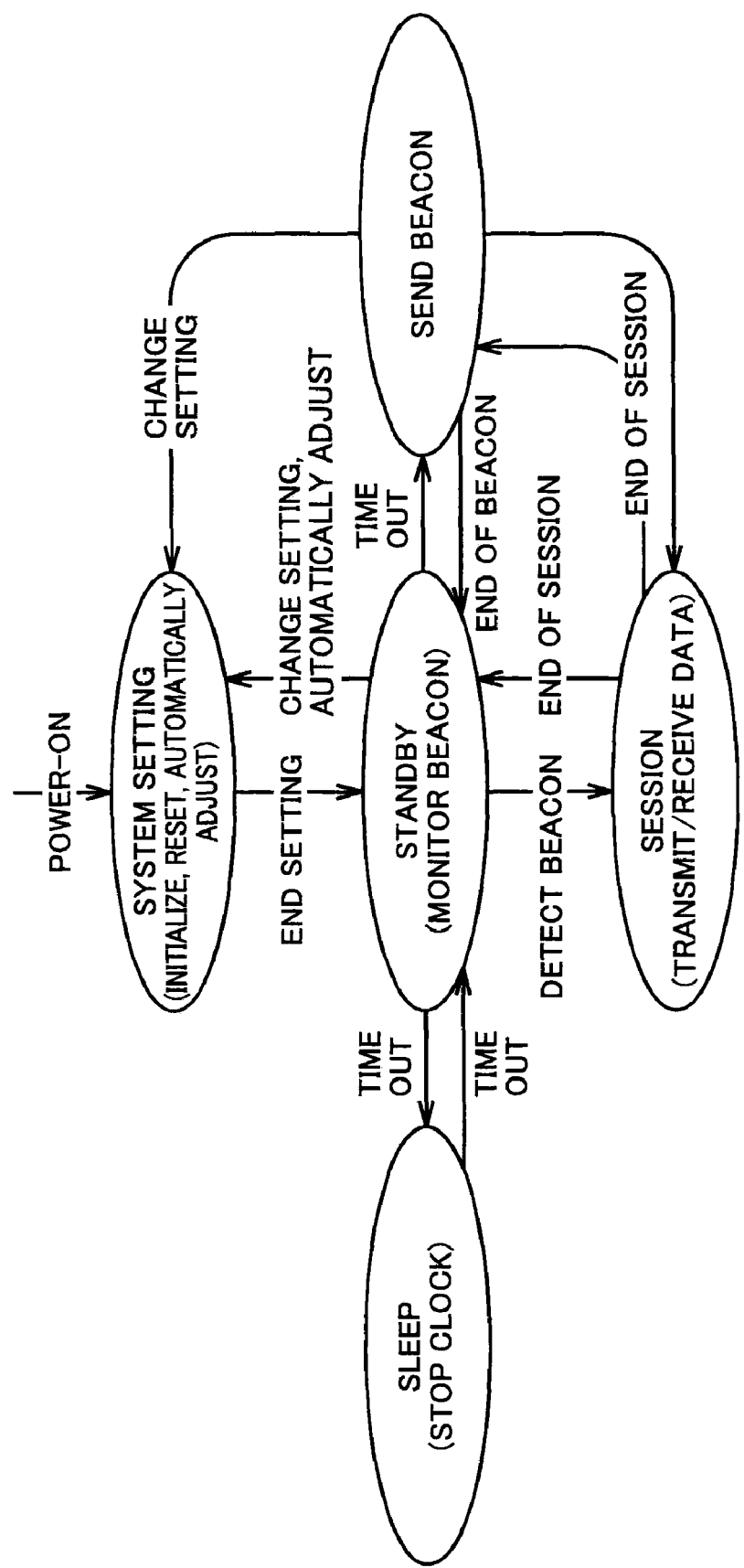
FIG. 27 shows a system state transition model according to the fourth embodiment.

FIG. 27 shows a transition model of the system state according to the embodiment. In this transition model, the clock stop state during sending of the Beacon frame is not described for the same of simplicity. In the terminals shown in the figure, the system setting is performed in response to power-on. By this setting, data designating the standby period ((wake period)+(sleep period)) and the wake period as well as other data are set. Thereafter, the state changes to the standby state (wake period), and the Beacon frame on network 10 is monitored. When the Beacon frame is not received during a certain wake period that is already set (in the case of time-out), the sleep period starts. When the sleep period of a certain length ends (time-out), the standby period (wake period) starts, and the Beacon frame is monitored. When the Beacon frame is received during the monitoring (Beacon detection), the session period (data transmission and reception) starts. When the data transmission and reception end and the session period ends, the standby period (wake period) starts.

Figure 28:
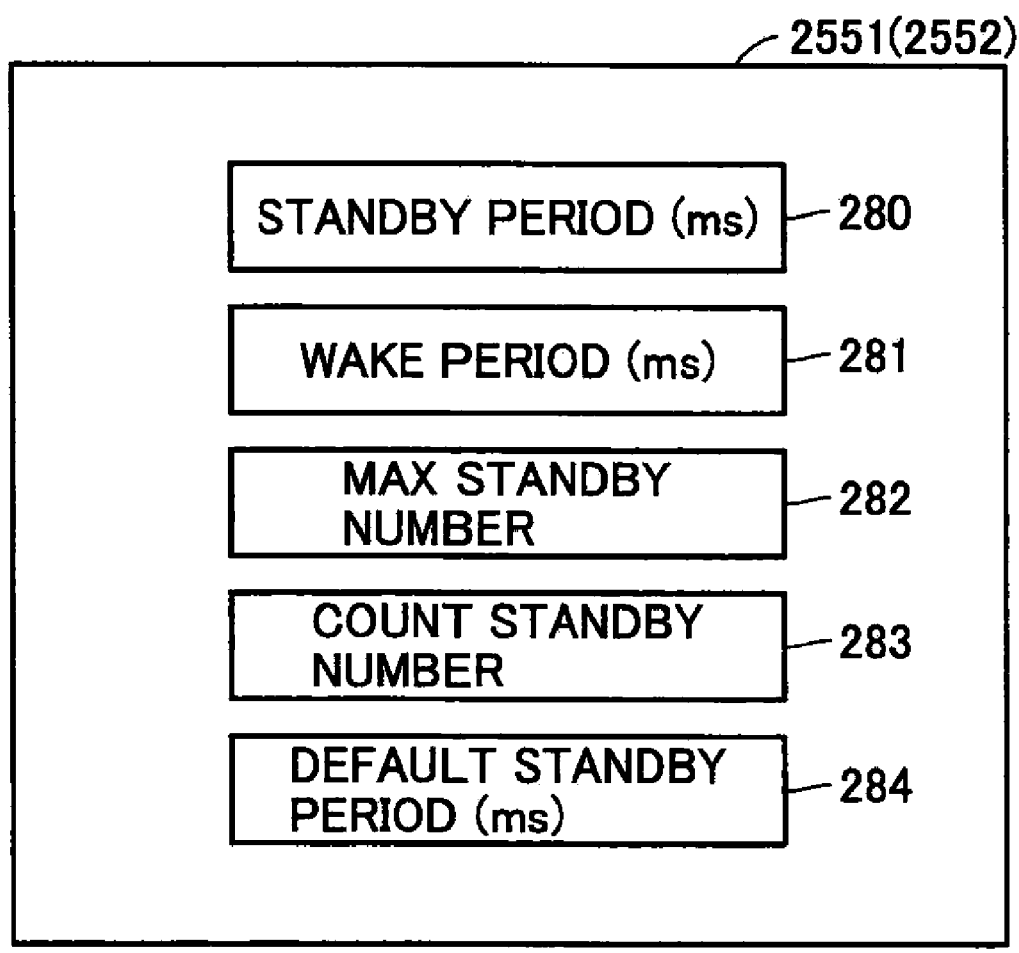
FIG. 28 illustrates various parameters according to the fourth embodiment.

The state transition in FIG. 27 is implemented by referring to various parameters that are set in advance in shared memory (2551, 2552). FIG. 28 shows various parameters stored in advance in shared memory (2551, 2552). The parameters include standby period data 280, wake period data 281, MAX standby number data 282 relating to the number of times of standby, count standby number data 283 relating to the number of times of count standby and default standby period data 284. The data in FIG. 28 is stored in a storage area that can hold the stored contents even when the power is not supplied from power supply circuit 201.

The various parameters in FIG. 28 are externally entered by operating the input unit (1061, 1062) of the host system (1001, 1002), and are stored in the shared memory (2551, 2552). Alternatively, the various parameters are stored in the shared memory (2551, 2552) by the CPU (1001, 1012) according to the application program to be executed by host system (1001, 1002). Therefore, the data in the shared memory can be variably set by operating the input unit (1061, 1062), or can be variably set according to the type or the like of the application to be executed.

Since the foregoing description is primarily based on the intermittent transmission-reception ad hoc mode between terminals STA1 and STA2, it has been described that shared memories 2551 and 2552 store the parameters as shown in FIG. 28. However, terminal STA2 likewise stores the parameters.

Figure 29:
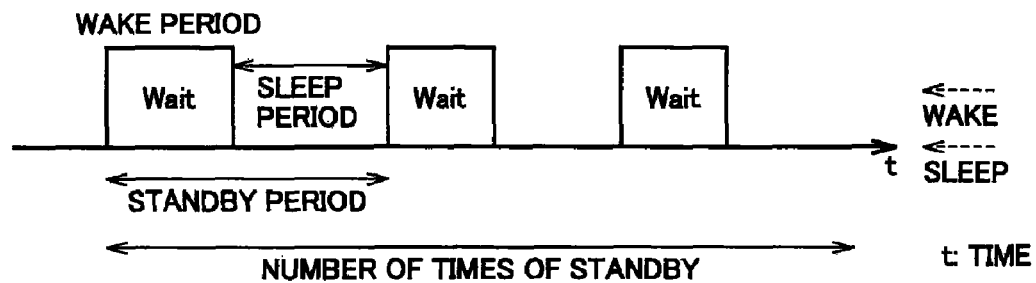
FIG. 29 illustrates a function of setting an intermittence period according to the fourth embodiment.

As shown in FIG. 29, the standby period is formed of the wake and sleep periods. Therefore, the sleep period can be calculated by ((sleep period)=(standby period data 280)−(wake period data 281)).

MAX standby number data 282 indicates a threshold for updating (changing) standby period data 280. More specifically, standby period data 280 is changed (adjusted) when the Beacon frame cannot be received (detected) even after the standby (wake period) is repeated a number of times indicated by MAX standby number data 282. The value indicated by count standby number data 283 has a function as a kind of counter that indicates the number of times of the transition to the standby state that occurs during a period from reception of the Beacon frame to subsequent reception thereof. The value of count standby number data 283 is reset and updated, e.g., to zero in response to every reception of the Beacon frame.

Default standby period data 284 is referred to for calculating and thereby updating the standby period (ms) indicated by standby period data 280 as will be described later.

As shown in FIG. 29, the Beacon frame can be received during the wake period within the standby period. Therefore, when importance is placed on the Beacon frame reception possibility (Beacon frame detection possibility), the standby period (ms) indicated by standby period data 280 is set short, and the wake period (ms) indicated by wake period data 281 within the standby period is set long. Conversely, when importance is placed on reduction of the power consumption during the standby period, standby period data 280 and wake period data 281 are set to provide the long standby period (ms) and the short wake period.

Figure 30:
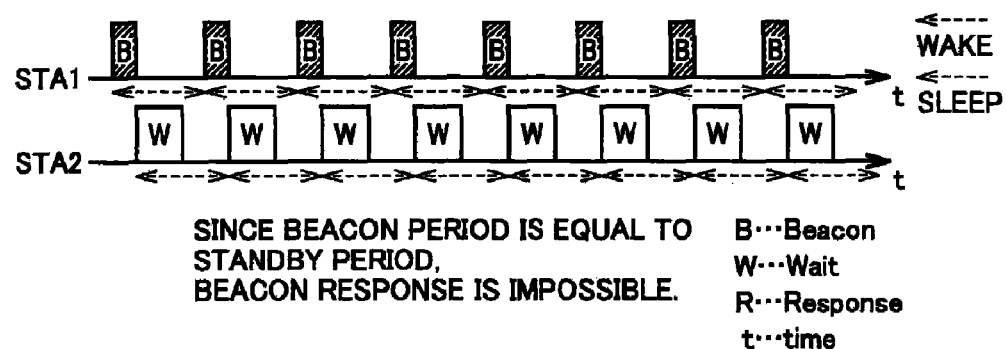
FIGS. 30 and 31 illustrate a function of adjusting the intermittence period according to the fourth embodiment.
Figure 31:
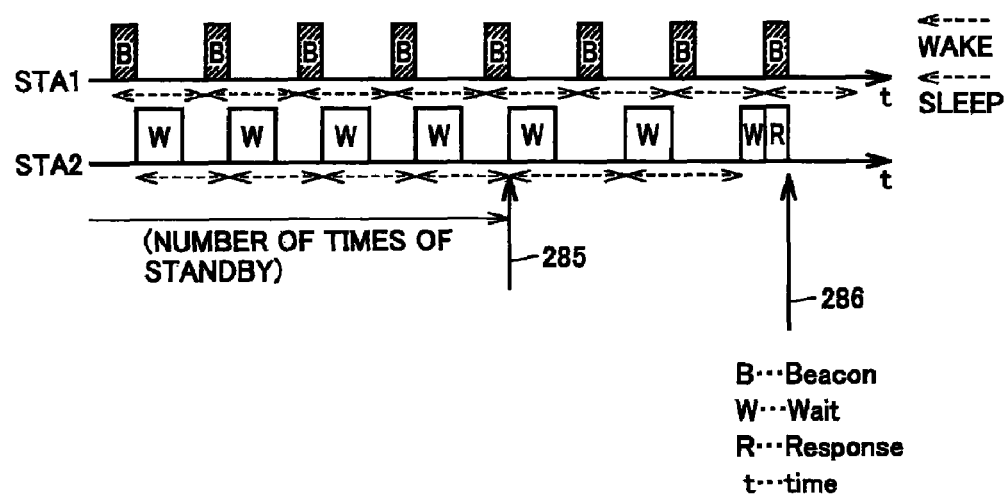

FIGS. 30 and 31 illustrate the variable setting (automatic adjustment) of the standby period. For example, when the wait period is fixed as shown in FIG. 30, such a case may occur that the transmission completion period of the Beacon frame of terminal STA1 matches the period of start of the wake period of terminal STA2. In this case, terminal STA2 in the wake period cannot receive Beacon frame 300 so that the session is not established between them, and the data communications are not performed.

Conversely, in the case where an automatic adjusting function for the standby period in FIG. 31 is employed, when the value of count standby number data 283 exceeds the value indicated by MAX standby number data 282 during a period indicated by an arrow 285, the foregoing matching of the periods may occur, and therefore the standby period (ms) indicated by standby period data 280 of terminal STA2 is changed (updated). Thereby, the periods can be shifted from each other, and the transmission period for Beacon frame 300 of terminal STA1 matches the wake period of terminal STA2 according to timing indicated by an arrow 286 in FIG. 31. Thereby, terminal STA2 can receive Beacon frame 300 from the terminal STA1 side, and the data communication can be performed between them.

In this embodiment, the updating of the standby period (ms) indicated by standby period data 280 is performed as follows. The CPU (2511, 2512) calculates a new standby period according to an equation (1) of ((updated standby period)=(default standby period indicated by default standby period data 284)+(random coefficient)), and stores the calculated standby period as standby period data 280 in the shared memory (2551, 2552) by overwriting with standby period data 280 so that the above updating is performed.

The random coefficient used for the calculation of the standby period (ms) can be produced from the following parameters held by terminal 1. These parameters are, e.g., the MAC address, the number of times of error, the real-time clock (date and time) indicated by clock circuit 202 and the time data indicated by hardware timer 256. The number of times of error indicates a total number of the times which the standby period (ms) is updated with reference to MAX standby number data 282.

Figure 32:
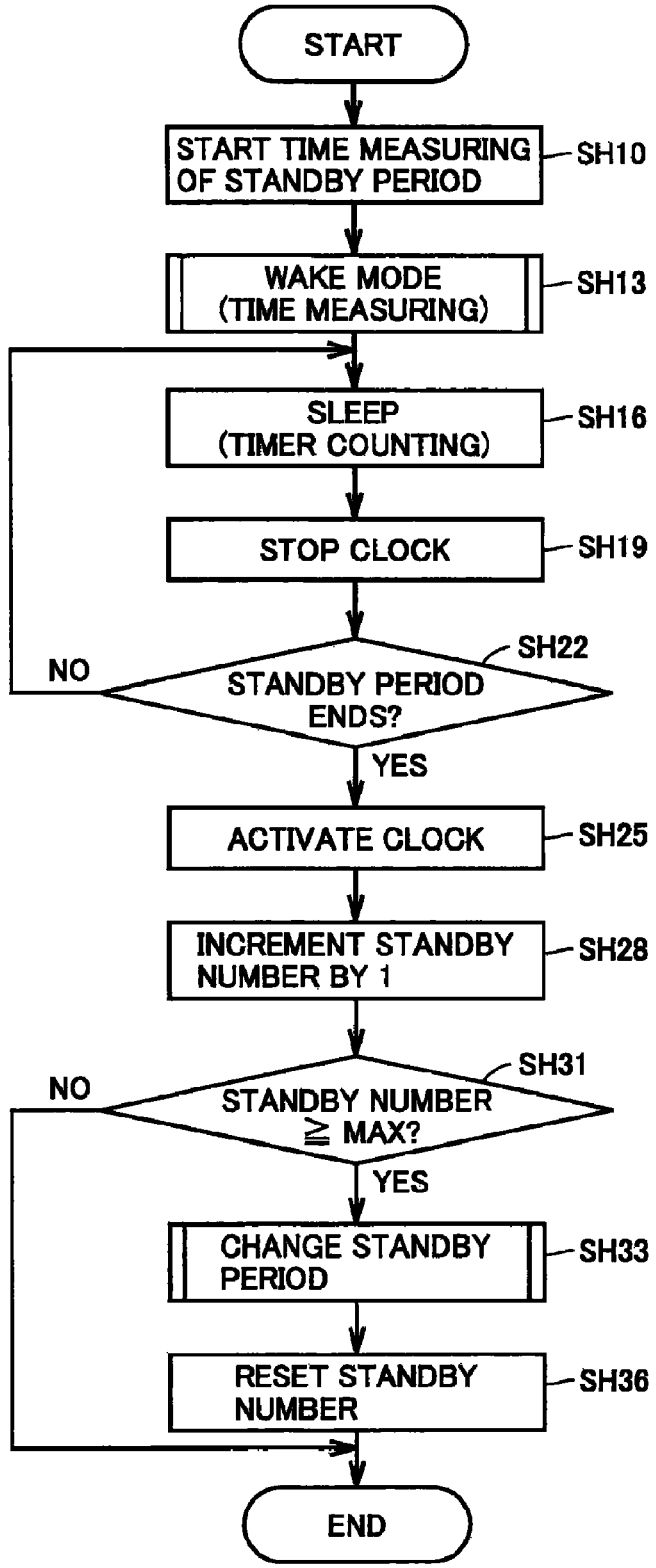
FIG. 32 is a flowchart of processing during a standby period according to the fourth embodiment.
Figure 33:
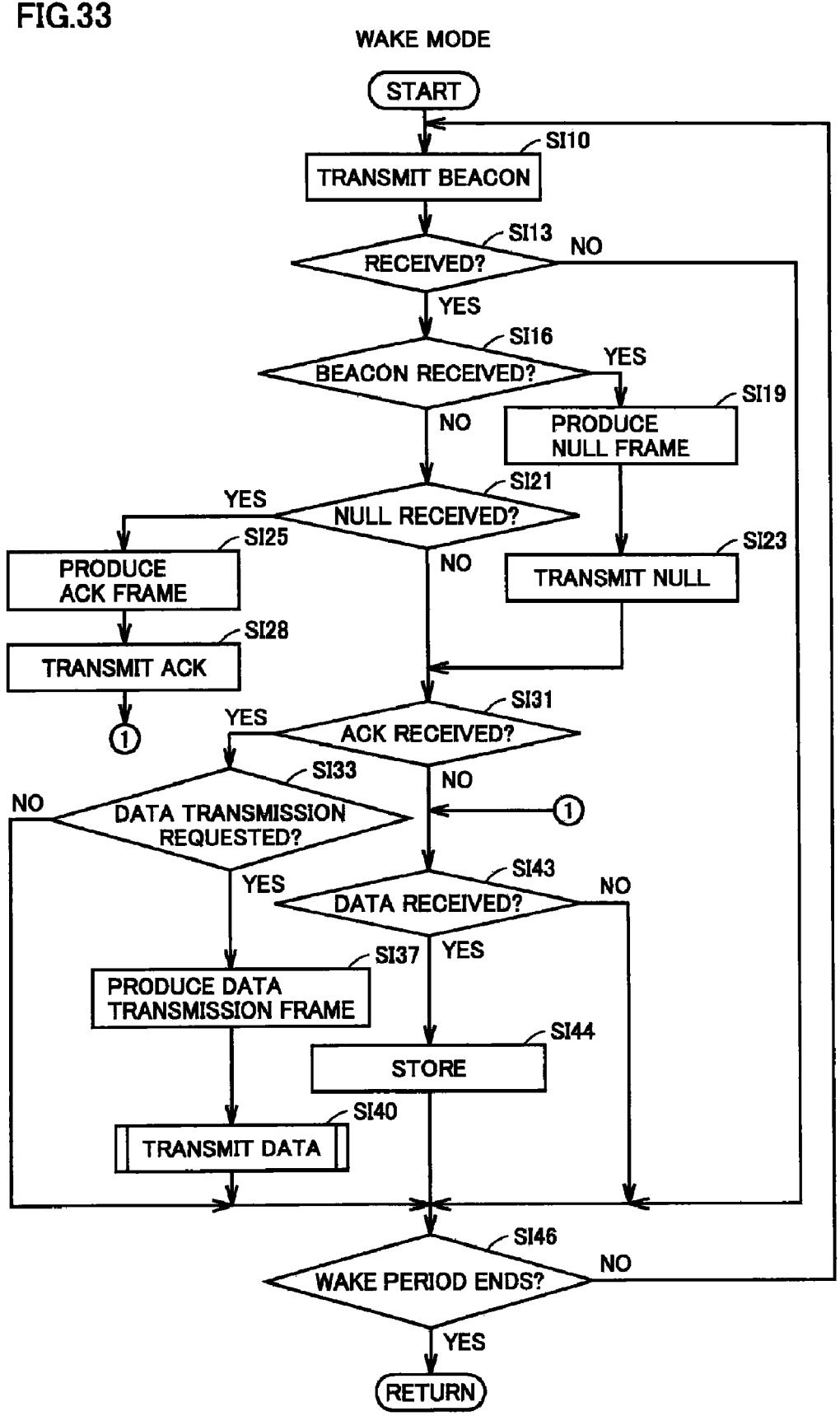
FIG. 33 is a flowchart of processing during a wake period according to the fourth embodiment.

Referring to flowcharts of FIGS. 32 and 33, the intermittent transmission-reception ad hoc mode according to the sequence in FIG. 23 will be described below. The flowcharts of FIGS. 32 and 33 are defined based on the assumption that the communications are performed between terminals STA1 and STA2. It is also assumed that the power is already on, and shared memory 2552 (2552) has already stored the data shown in FIG. 28. Count standby number data 283 is initially set to zero.

According to FIG. 32, terminal STA1 waits for the reception of Beacon frame 300 over network 10 while transmitting Beacon frame 300, and this operation will be described below.

When the power supply is turned on to start the standby period, CPU 2511 starts to measure the time of the wake period in step SH10, based on the measured time data provided from a timer 2561. When the standby period starts, the operation first enters the wake period (wake mode). In step SH13, CPU 2511 measures (senses) an elapsed time in this wake period based on the measured data of timer 2561. The processing in this wake period will be described later with reference to FIG. 33.

When it is determined that the wake period expired, the sleep period starts. In steps SH16 and SH19, clock circuit 2021 does not supply the clock, and various portions do not consume the power so that the transmission and reception are impossible. Further, timer 2561 measures the elapsed time in the sleep period.

In step SH22, timer 2561 compares the measured value with the value of the sleep period. When the result of this comparison indicates the relationship of ((measured time value)≧(value of the sleep period)) (YES in step SH22), it is determined that the sleep period ends, i.e., the standby period ends, and the process proceeds to step SH25 (to be describe later). It is assumed that the value of the sleep period is calculated in advance according to ((standby period data 280)–(wake period data 281)) using the value read from shared memory 2551 by CPU 2511, and is provided to timer 2561.

While the result of the comparison is representing ((measured time value)<(value of the sleep period)) (NO in step SH22), it is determined that the standby period has not ended, and the processing in steps SH16, SH19 and SH22 is repeated.

In step SH25, timer 2561 provides the ON instruction to clock circuit 2021, and thereby clock circuit 2021 resumes the supply of the clock signal to various portions for enabling the transmission and reception. When the input of the clock signal is resumed, CPU 2511 increments (updates) count standby number data 283 of memory 2551 by one in step SF28.

Thereafter, CPU 2511 determines, by comparison, whether the value of count standby number data 283 is equal to or larger than the value indicated by MAX standby number data 282 or not. More specifically, when it is not determined in step SH31 that the comparison result represents ((count standby number data 283)≧(MAX standby number data 282)) (NO in step SH31), the processing of changing standby period data 280 is not performed, a series of processing ends and the processing for the next standby period starts.

When it is determined that the comparison results represent ((count standby number data 283)≧(MAX standby number data 282)) (YES in step SH31), CPU 2511 calculates the processing of changing the standby period according to the foregoing equation (1) in step SH33, and standby period data 280 of shared memory 2551 is updated using the calculated value. CPU 2511 resets count standby number data 283 of shared memory 2551 to zero. Thereafter, the series of processing ends, and the processing for the next standby period starts.

Referring to FIG. 33, description will be given on the wake period processing in step SH13. During the wake period, a control MAC unit 2571 of terminal STA1 transmits Beacon frame 300 of the broadcast in step SI10, and then determines in step SI13 whether any signal is received or not.

When it is determined that no signal has been received (NO in step SI13), control MAC unit 2571 notifies CPU 2511 of it, and CPU 2511 determines in step SI46 based on the measured time data provided from timer 2561 whether the wake period has ended or not. More specifically, the input measured time data is compared with wake period data 281 read from shared memory 2551, and the wake period will end when the result of this comparison represents ((input measured time data≧(wake period data 281)) (YES in step SI46). Then, the sleep period in step SH16 shown in FIG. 32 starts.

When the result of this comparison represents ((input measured time data≦(wake period data 281)) (NO in step SI46), the processing returns to step SI10, and Beacon frame 300 is transmitted.

When it is determined that Beacon frame 300 is received from terminal STA1 over network 10 (YES in step SI13, YES in step SI16), control MAC unit 2571 produces Beacon frame 300 in response to the foregoing NULL in steps SI19 and SI23, and transmits it to terminal STA1. Thereafter, the process proceeds to step SI13, and it is determined whether Beacon frame 300 of the ACK response is received from terminal STA2 on the other end of the communications.

When control MAC unit 2571 determines that the frame of the NULL response is received (YES in step SI21), control MAC unit 2571 produces and transmits Beacon frame 300 of the ACK response in steps SI25 and SI28. Thereafter, the processing proceeds to step SI43 to be described later.

When it is determined that control MAC unit 2571 has received Beacon frame 300 of the ACK response (YES in step SI31), and the data transmission request is input from host system 1001 at this point in time (YES in step SI33), control MAC unit 257 produces the frame for the data transmission based on the data provided from host system 1001 in steps SI37 and SI40. The frame of data thus produced is transmitted.

Conversely, when it is determined that Beacon frame 300 of the ACK cannot be received from terminal STA2 (NO in step SI31), it is determined whether the data frame is received or not (step SI43). When it is determined that control MAC unit 2571 has not received the data frame (NO in step SI33), the processing in step SI46 starts.

When it is determined that the data frame is received (YES in step SI43), a program memory 2541 temporarily stores the data of the received data frame in step SI44. Thereafter, the received data stored in program memory 2541 is transmitted to host system 1001, and is processed on the host system 1001 side. When it is not determined that the data frame is received (NO in step SI43), the process proceeds to step SI46.

Although the processing during the standby period on terminal STA1 side has been described, terminal STA2 can perform the similar processing during the standby period for reducing the power consumption.

According to the embodiment, the sleep period (clock stop period) is periodically set during the transmission and reception standby period to prevent power consumption in each of communication circuit 200. Therefore, it is possible to reduce the power consumption of the wireless LAN devices, i.e., terminals STA1, STA2 and STA3.

During the sleep period, each portion is not supplied with the clock and therefore cannot perform the communications with another terminal. However, when the period during which the communications cannot be performed continues for a certain time or more, the sleep period or the sleep cycle can be automatically changed using the foregoing equation (1) in each terminal so that the possibility of receiving Beacon frame 300 can be changed.

[Fifth Embodiment]

This embodiment is related to the case where the communications are performed according to the IEEE 802.11 standards that are a kind of the wireless LAN (Local Area Network) standards, and performs the communication control of the network by such a manner that not only the management information (IBSSID 313, SSID 3211 and the like) of each terminal 1 but also the user-defined data and the data (substantial data) to be transmitted are transmitted and received by a defined management frame on wireless LAN network 10 described in the first or second embodiment. Thereby, the user-defined data and the substantial data to be transmitted can be transmitted and received using the management frame, and the communication efficiency can be improved as compared with the case where an independent data communication frame (i.e., independent frame for data communications) is transmitted and received.

In this embodiment, the management frame is defined by the ad hoc network, and terminal 1 transmits the user-defined information, using an unused area of frame body portion 320 of Beacon frame 300 that is transmitted and received for scanning network 10 by terminal 1.

In this embodiment, terminals 1, STA1 and STA2 have substantially the same structures as those shown in FIGS. 2, 14 and 15, and therefore description thereof is not repeated.

This embodiment provides a mode filtering function that filters the frame according to the communication mode of terminal 1. Terminal 1 filters the received frame according to its own communication mode and the communication mode of the sender terminal.

The communication modes employed in this embodiment will now be described. One of them is the intermittent transmission-reception ad hoc mode that is described in connection with the fourth embodiment.

Another communication mode is a scanless ad hoc mode, in which the scanning by detecting the Beacon frame of network 10 is not performed, and the data communications can be performed only by the broadcast. This type of communications are proposed by the applicant in Japanese Patent Laying-Open No. 2006-322087, and therefore description thereof is not repeated.

Still another communication mode is a standard ad hoc mode, in which scanning is periodically performed between the opposite terminals, and the data is transmitted by the broadcast according to a UDP (User Datagram Protocol) when a transmission request is issued.

Figure 34:
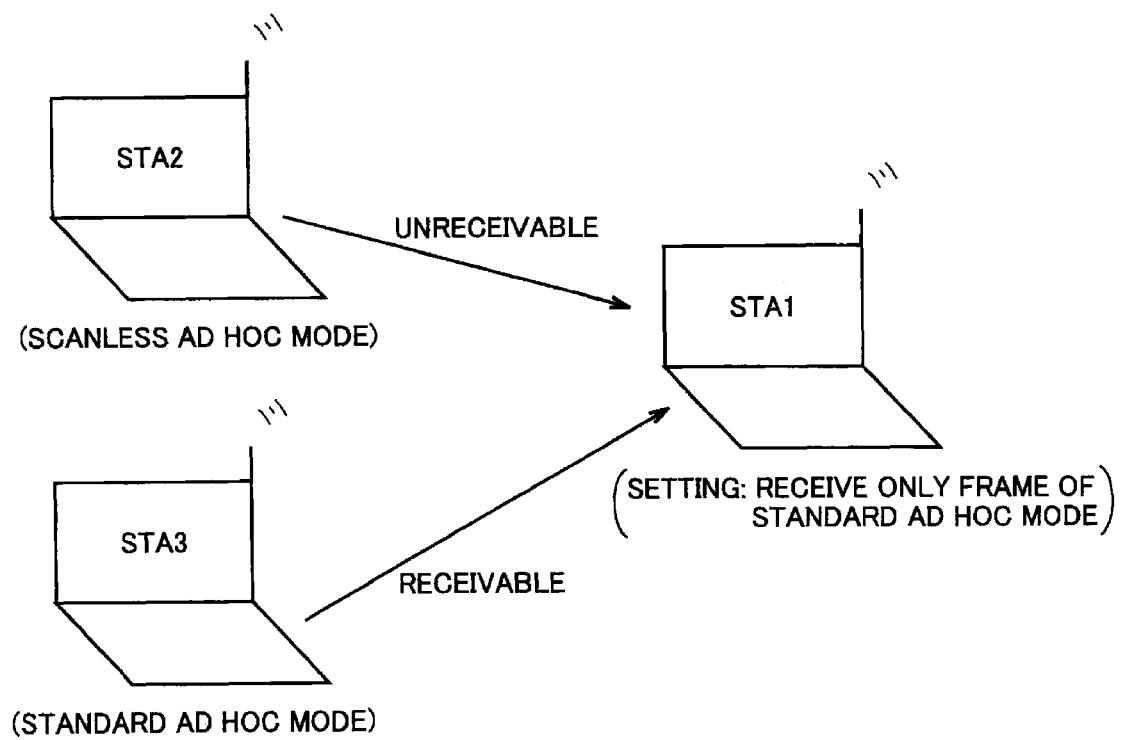
FIG. 34 schematically shows a concept of communications according to a fifth embodiment.
Figure 35:
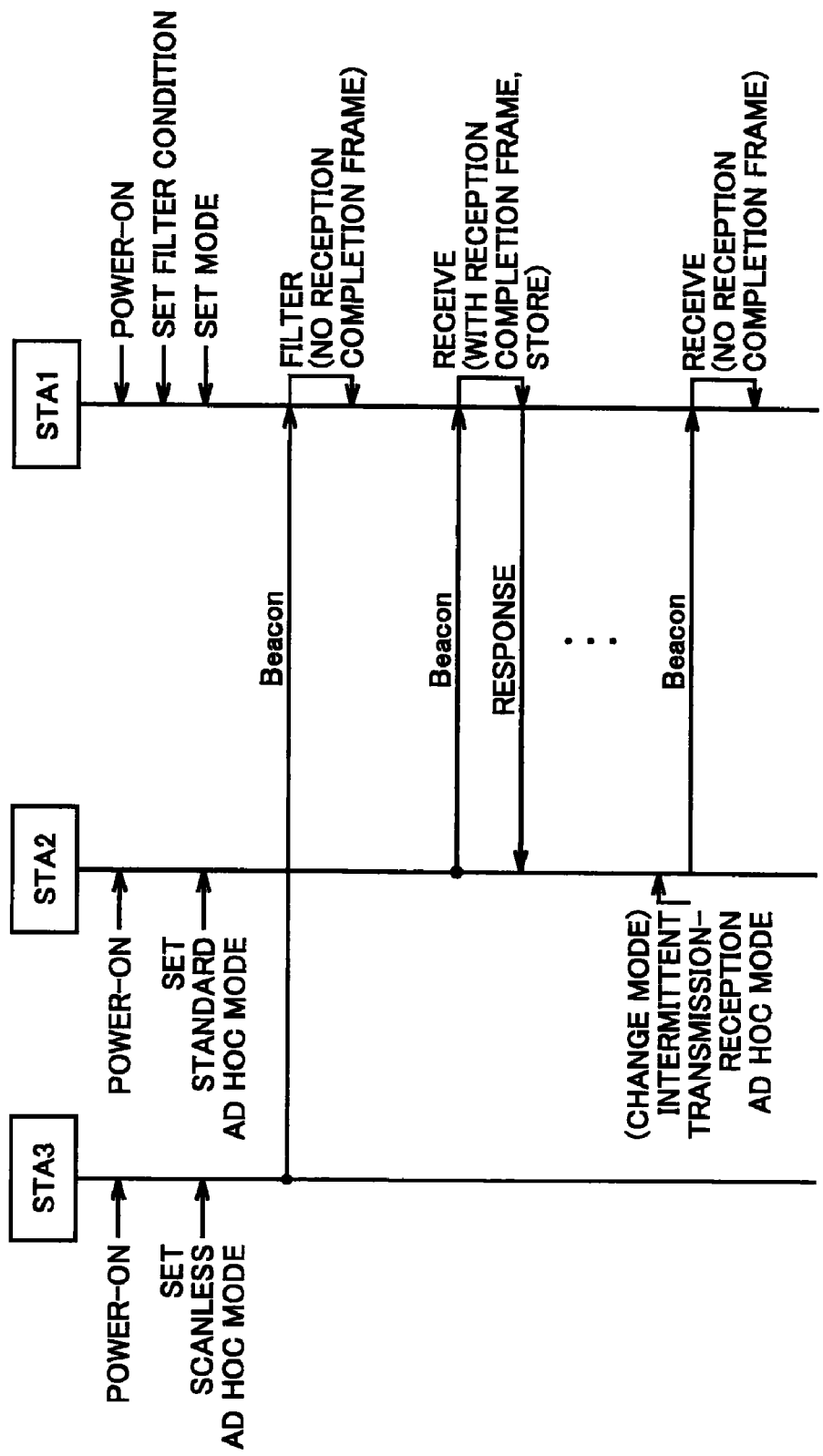
FIG. 35 schematically shows a communication sequence according to the fifth embodiment.

FIGS. 34 and 35 schematically show the communication sequence for performing the packet filtering.

Referring to FIG. 34, it is assumed that filter conditions of terminal STA1 are configured to receive only the frame provided from the terminal in the standard ad hoc mode. Terminals STA2 and STA3 that are present in the same radio cell as terminal STA1 are set to the scanless ad hoc mode and the standard ad hoc mode, respectively. In this case, terminal STA1 operating according to the filter conditions does not receive the frame of terminal STA2 in the scanless ad hoc mode, and receives the frame from terminal STA3. Therefore, according to the communication mode of the terminal on the other end, it is possible to determine whether the frame from the terminal in question is to be received or not (i.e., to be filtered or not), and the operation can be performed based on the result of this determination. Thereby, selection can be performed to reject the frame provided from the terminal in the undesired communication mode. In this embodiment, host system 100 can variably set the filter conditions so that the load exerted on the host system 100 side by receiving the undesired data can be reduced.

It is assumed that the communication mode and filter conditions in FIG. 34 are employed in a communication sequence in FIG. 35. The communication mode is set in each of terminals STA1, STA2 and STA3 in response to the power-on. Although the filter conditions are set in each terminal, it is assumed that the filter conditions are set in only terminal STA1, for the sake of simplicity.

Since the filter conditions of terminal STA1 are set to "receive only the frame in the standard ad hoc mode", the Beacon frame provided from terminal STA3 is filtered (i.e., rejected) so that a completely received frame does not exist. However, the Beacon frame provided from terminal STA2 is received, and is determined by terminal STA1 that the completely received frame exists so that the data of this frame is temporarily stored in program memory 2541 or the like by control MAC unit 2571, and thereafter is provided to host system 1001. In this operation, control MAC unit 2571 returns the response frame to terminal STA2.

When the communication mode of terminal STA2 changes from the standard ad hoc mode to the intermittent transmission-reception ad hoc mode thereafter, terminal STA1 will likewise filter the Beacon frame provided from terminal STA2.

FIG. 34 shows the communication mode according to the embodiment. When the communication mode is the standard ad hoc mode, the communication mode of the terminal stored in the frame is set to a value of "STANDARD". When it is the intermittent transmission-reception ad hoc mode, the communication mode is set to a value of "INTMT". When it is the scanless ad hoc mode, the communication mode is set to a value of "SCNLS". These communication modes are employed by way of example for describing the embodiment, and the modes are not restricted to them.

FIG. 36 shows a list indicating values (5 Bytes) and meaning of "Mode Info" identifying these communication modes in this embodiment. The table indicating the correlation between them is stored in advance in RAM 103.

Figure 37:
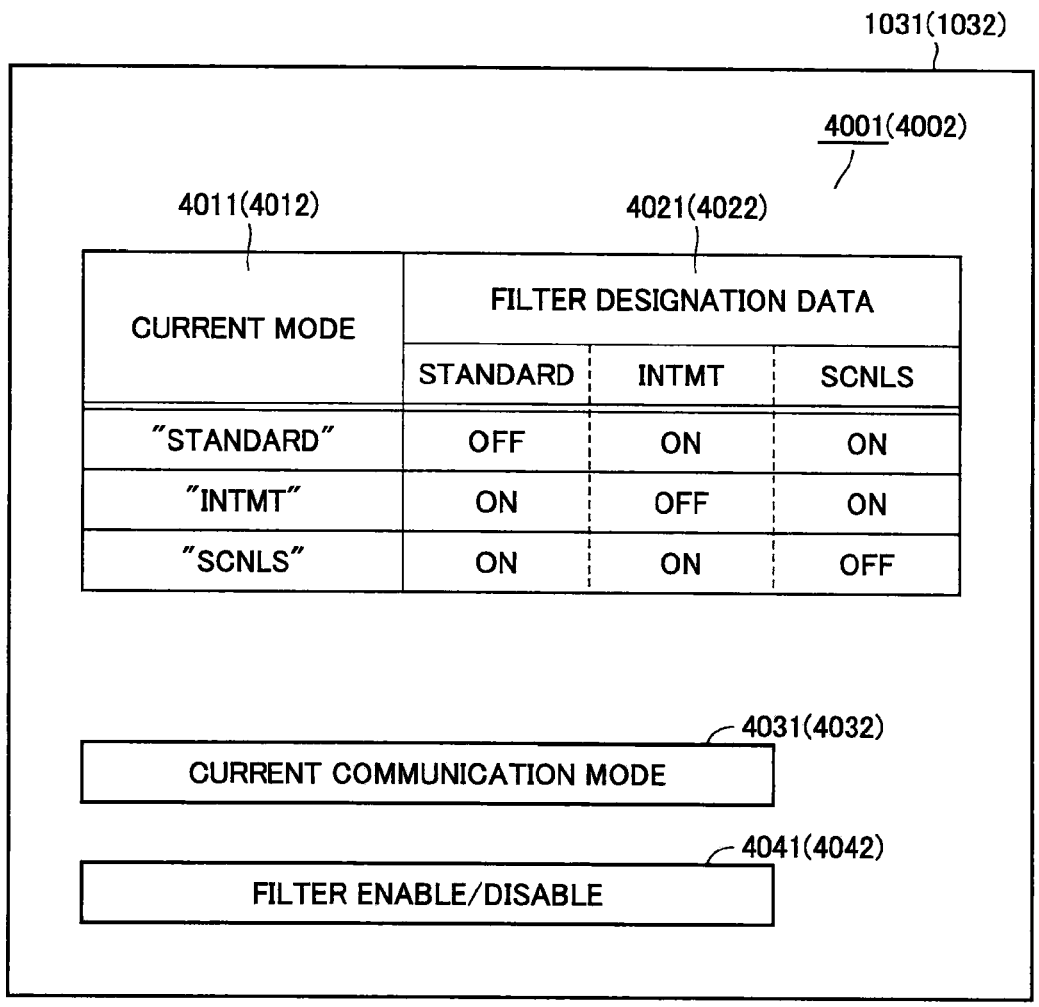
FIG. 37 shows an example of storage contents on a host system side according to the fifth embodiment.

FIG. 37 shows an example of the data stored in RAM 1031 of host system 1001. RAM 1031 has stored a table 4001. Table 4001 includes data 4011 indicating the current communication modes that can be set in terminal STA1, and also includes filter designation data 4021 corresponding to data 4011. FIG. 37 shows the following example. When the current communication mode is "STANDARD" (see FIG. 36), terminal STA1 receives (OFF: filtering) only the frame from the terminal storing, as filter designation data 4021, the value of Mode Info indicating "STANDARD", and does not receive (ON: filtering) the frame from the terminal in another communication mode. In the cases of other communication modes "INTMT" and "SCNLS", filter designation data 4021 can variably set the filtering and non-filtering of the frame provided from the sender terminal according to the communication mode of the sender terminal.

RAM 1031 has stored data 4031 indicating the current communication mode, and data 4041 indicating whether the mode filtering function is to be enabled or disable.

In terminal STA2, RAM 1032 stores a table 4002 corresponding to table 4001 and having the contents shown in FIG. 37, and data 4032 and data 4042 corresponding to data 4031 and 4041, respectively.

The details of data shown in FIG. 37 can be changed by the operation performed through input unit 1061 (1062) into those desired by the user, and also can be changed by CPU 1011 (1012) according to the application to be executed in host system 1001 (1002).

Figure 38:
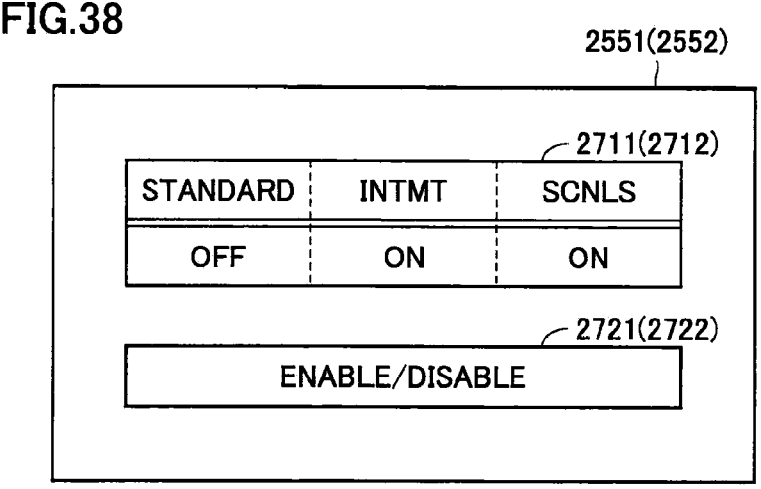
FIG. 38 shows an example of storage contents on a communication circuit side according to the fifth embodiment.

FIG. 38 shows an example of the data that is stored in shared memory 2551 of communication circuit 2001 in terminal STA1. Referring to FIG. 38, shared memory 2551 stores filter condition data 2711 received from host system 1001 and data 2721 indicating whether the filter function is to be enabled or disabled. Shared memory 2522 of communication circuit 2002 in terminal STA2 likewise stores filter condition data 2712 and data 2722 already described with reference to FIG. 38 according to the contents received from host system 1002.

CPU 2511 (2512) receives the data read and provided from RAM 1031 (1032) of corresponding host system 1001 (1002), and writes it in shared memory 2551 (2552) so that the data in shared memory 2551 (2552) is set and updated.

Figure 39:
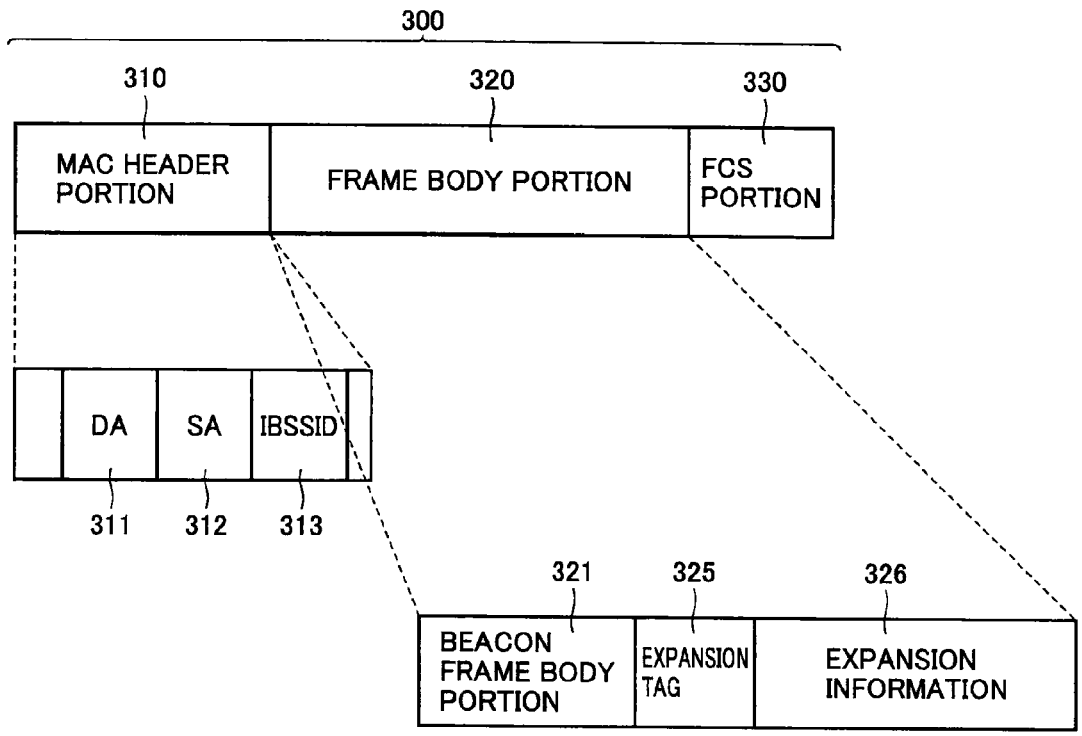
FIG. 39 shows an example of a schematic structure of a frame according to the fifth embodiment.

FIGS. 39 to 42 show an example of the structure of the frame according to the embodiment. Referring to FIG. 39, this embodiment transmits the communication mode information (the value of Mode Info) that is the information defined by the user, using the Beacon frame that is originally employed for transmitting the management information for the communication.

More specifically, the area of frame body portion 320 in Beacon frame 300 includes Beacon frame body portion 321, an expansion tag 325 and expansion information 326. Expansion tag 325 indicates the flag that is always stored as the standards. In this embodiment, expansion information 326 includes communication mode information (the value of Mode Info) 327 that indicates the current communication mode of the sender terminal of the Beacon frame in question.

Figure 40:
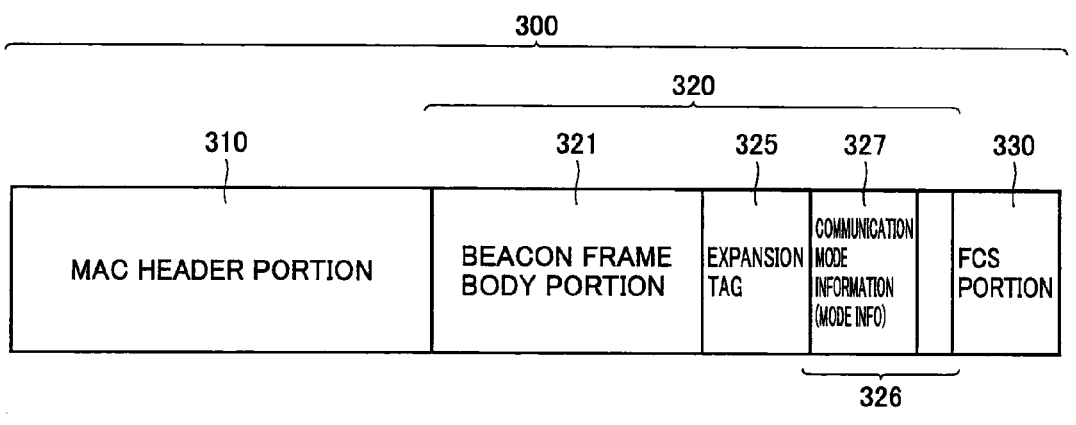
FIG. 40 shows an example of the frame according to the fifth embodiment.

FIG. 40 shows Beacon frame 300 that is transmitted when terminal 1 is in the standard ad hoc mode. Referring to FIG. 40, communication mode information 327 indicates "STANDARD". When it is in the intermittent ad hoc mode, communication mode information 327 indicates "INTMT" as can be seen in Beacon frame 300 in FIG. 41. When it is in the scanless ad hoc mode, communication mode information 327 indicates "SCNLS" as can be seen in Beacon frame 300 in FIG. 42.

Figure 41:
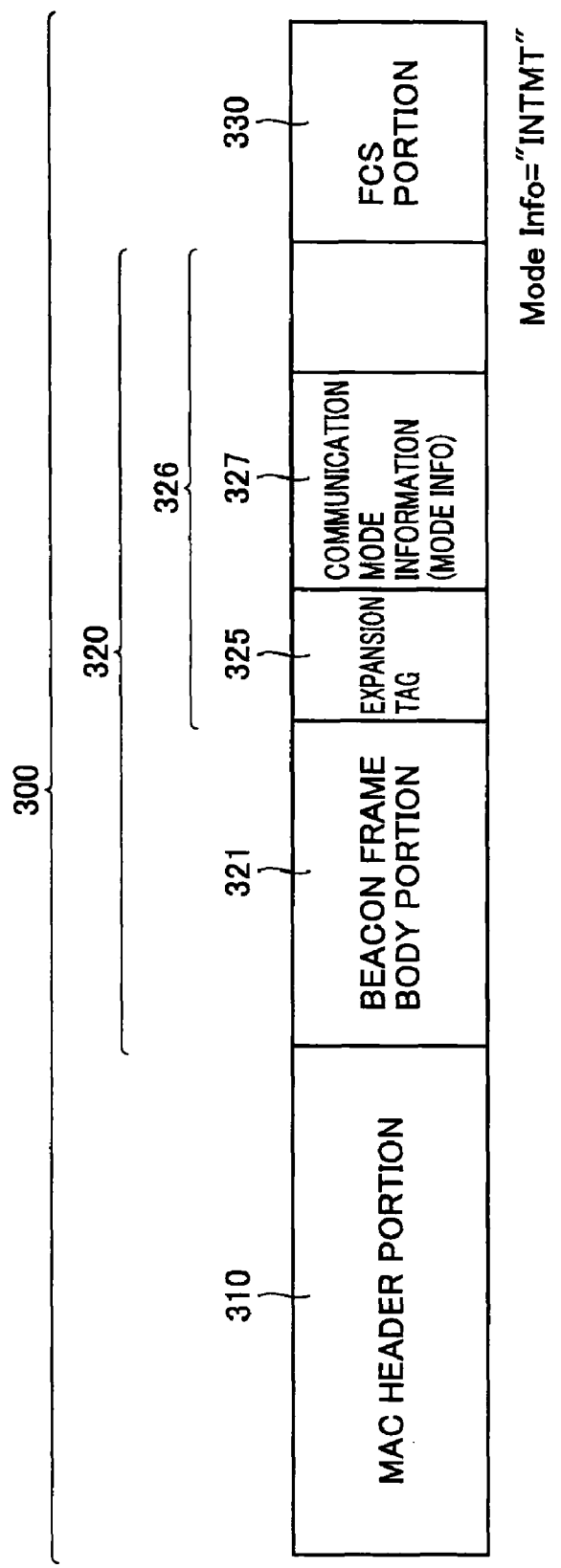
FIG. 41 shows another example of the frame according to the fifth embodiment.
Figure 42:
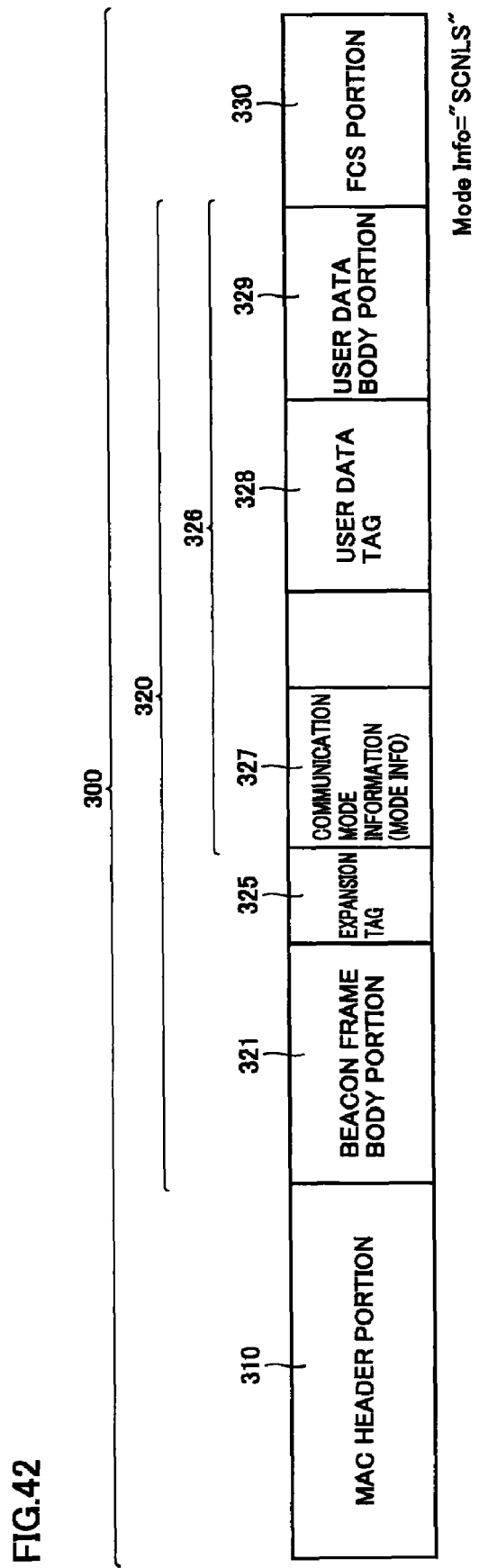
FIG. 42 shows still another example of the frame according to the fifth embodiment.

DA data 311 of Beacon frame 300 in FIGS. 40-42 indicates the destinations of the broadcast.

Referring to flowcharts in FIGS. 43, 44 and 45, description will be given on the case where the communications are performed between terminals STA1 and STA2 according to the sequence in FIG. 35. For the sake of simplicity, it is not assumed to perform the communications with terminal STA3. It is assumed that RAM 1031 (1032) has stored table 4001 (4002) in advance.

Figure 43:
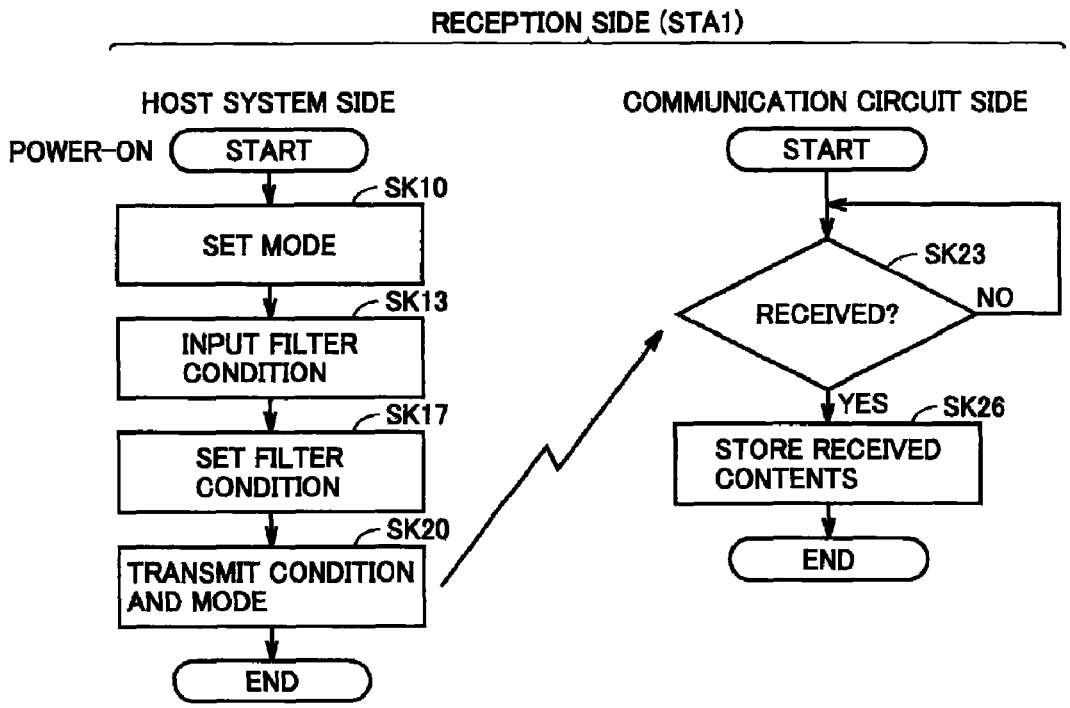
FIG. 43 is a flowchart of processing of a reception-side terminal according to the fifth embodiment.

Referring to FIG. 43, in host system 1001 of terminal STA1, the user enter the type of the communication mode, e.g., through input unit 1061 in step SK10. CPU 1011 may detect the type of the communication mode thus entered according to the type of the application program which the user desires to run. The communication mode thus entered is "STANDARD", and is stored in RAM 1031 as data 4031.

Then, in steps SK13 and SK17, the user enters the instruction for enabling or disabling the filter function as well as the filter conditions through input unit 1061 and stores them in RAM 1031. In this example, the entered instruction about the enable/disable of the filter function is stored by CPU 1011 as data 4041 in RAM 1031.

It has been described that the filter conditions are entered by the user through input unit 1061. However, the following manner may be employed. CPU 1011 may perform retrieval on table 4001 based on data 4031 that was entered and stored, and thereby may read filter designation data 4021 corresponding to communication mode 4011 indicated by data 4031 for obtaining it as the filter condition data.

In step SK20, CPU 1011 transmits the entered or obtained filter condition data and filtering enable/disable data 4041 to communication circuit 2001.

In communication circuit 2001 of terminal STA1, CPU 2511 detects in step SK23 whether any reception from host system 1001 occurred or not. When any reception is detected (YES in step SK23), the contents (filter condition data and filtering enable/disable data 4041) received from host system 1001 are stored in shared memory 2551 as filter condition data 2711 and data 2721 in step SK26, respectively.

Figure 44:
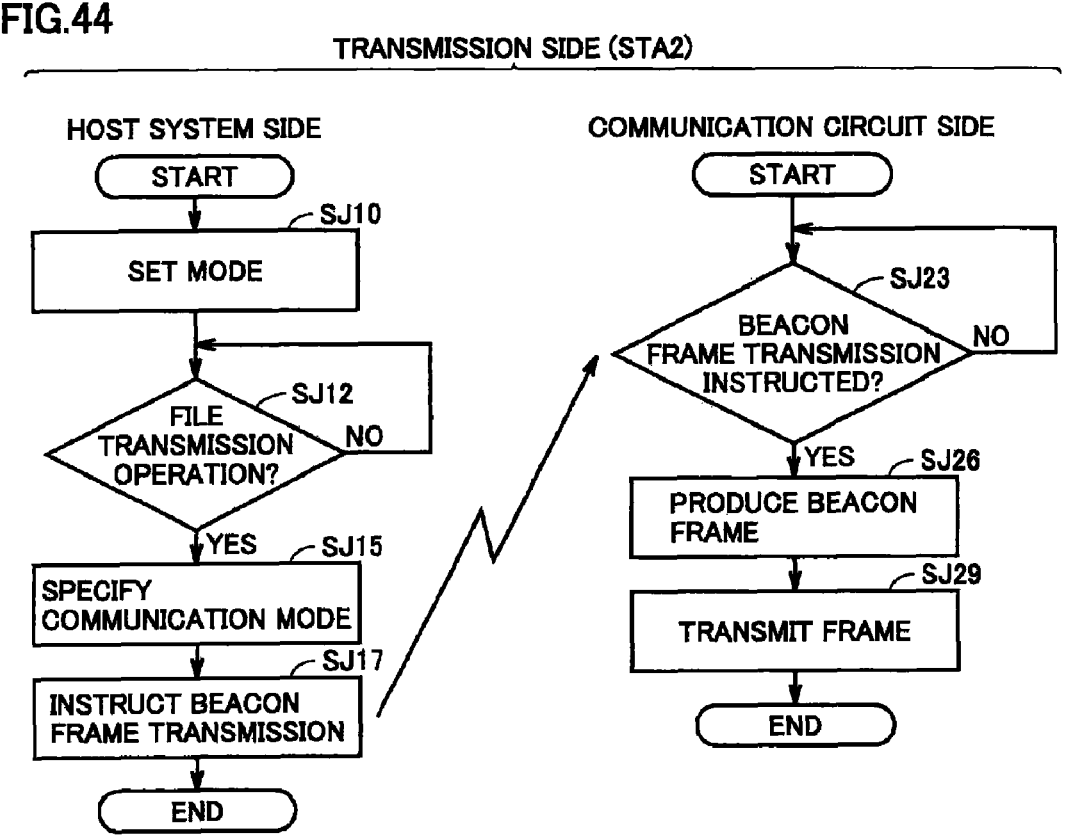
FIG. 44 is a flowchart of processing of a transmission-side terminal according to the fifth embodiment.

On the terminal STA2 side, the processing according to FIG. 44 is performed after the power-on. First, in host system 1002 of terminal STA2, the user provides the communication mode to CPU 1012 through input unit 1062 in step SJ10. Alternatively, CPU 1012 determines the communication mode according to the type of the application program to be executed. The type of the communication mode that is input or determined in the above manner is stored in RAM 1032 as data 4032. In terminal STA2, data 4042 indicating enable/disable of the filter function as well as the filter conditions are set and stored in RAM 1032 and shared memory 2522 (as filter condition data 2712 and data 2722), similarly in terminal STA1.

Then, CPU 1012 determines in step SJ12 whether the operation for the file transmission is performed through input unit 1062 or not. When it is determined that the file transmission operation is performed (YES in step SJ12), CPU 1012 provides the data of the transmission file, the Beacon frame transmission instruction and data 4032 of the current communication mode read from RAM 1032 to communication circuit 2002 in steps SJ15 and SJ17. It is assumed that the data of the file to be transmitted forms expansion information 326 of the Beacon frame in FIGS. 40-42, and the file has the data amount that can be completely transmitted by one Beacon frame.

In communication circuit 2002, CPU 2512 determines in step SJ23 whether the data and instruction transmitted in step SJ17 from host system 1002 is received or not.

When it is determined that the data and instruction are received (YES in step SJ23), control MAC unit 2572 produces the Beacon frame based on the instruction, and transmits it to network 10 in steps SJ26 and SJ29.

When control MAC unit 2572 receives the Beacon frame transmission instruction, it produces Beacon frame 300 in one of FIGS. 40, 41 and 42 based on the data of the input file and data 4032 of the communication mode. For example, when data 4032 indicates "STANDARD", Beacon frame 300 in FIG. 40 is produced. Likewise, Beacon frame 300 in FIG. 41 is produced when "INTMT" is indicated, and Beacon frame 300 in FIG. 42 is produced when "SCNLS" is indicated. Expansion information 326 of Beacon frame 300 thus produced includes the data of transmission file received from host system 1002.

It is assumed that data 4031 and data 4041 (2721) in terminal STA1 indicate the standard ad hoc mode ("STANDARD") and "filter function enabled", respectively, and data 4032 and data 4042 (2722) in terminal STA2 are set to the standard ad hoc mode ("STANDARD") and "filter function enabled", respectively.

Figure 45:
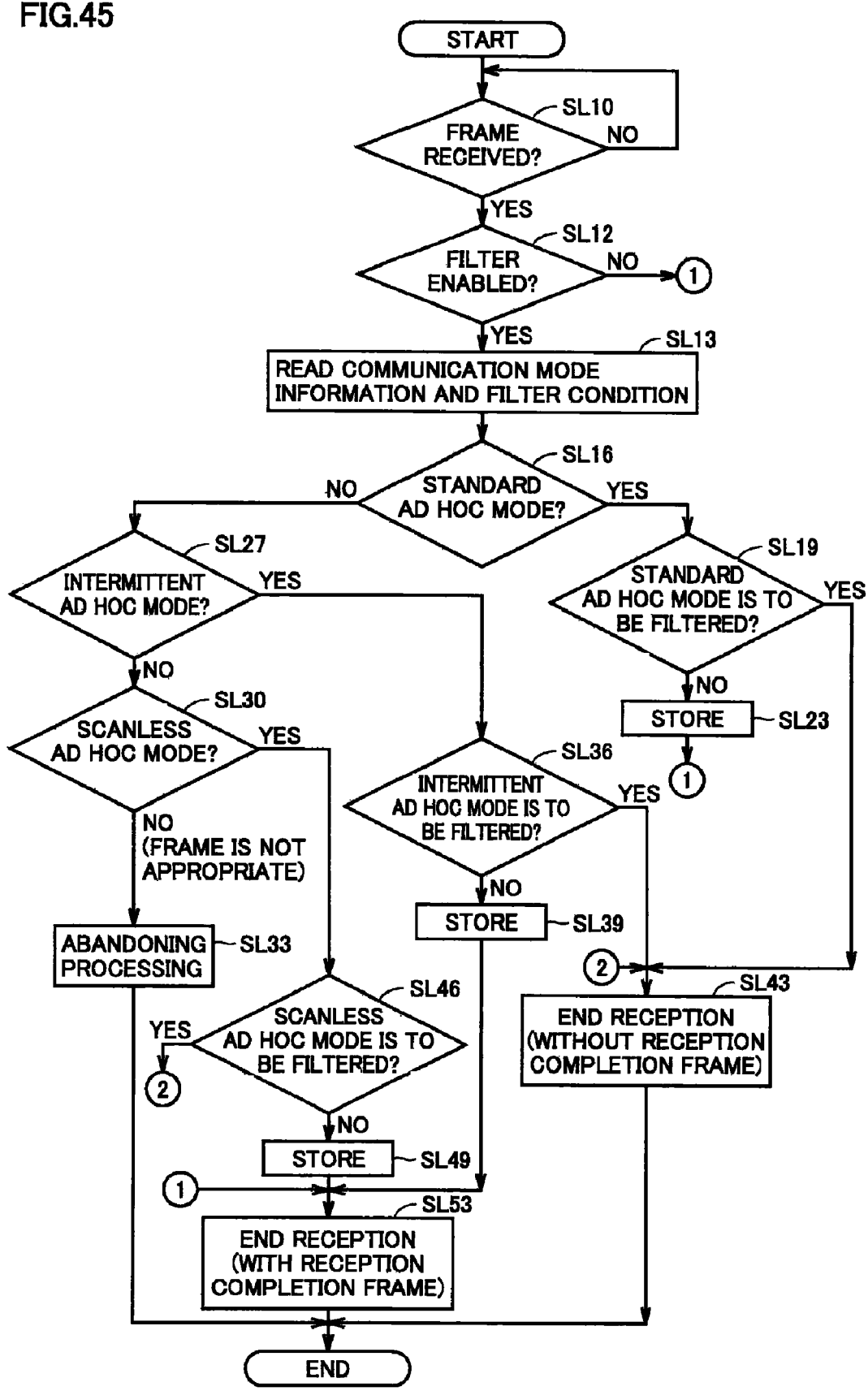
FIG. 45 is a processing flowchart of a frame filtering according to the fifth embodiment.
Figure 46:
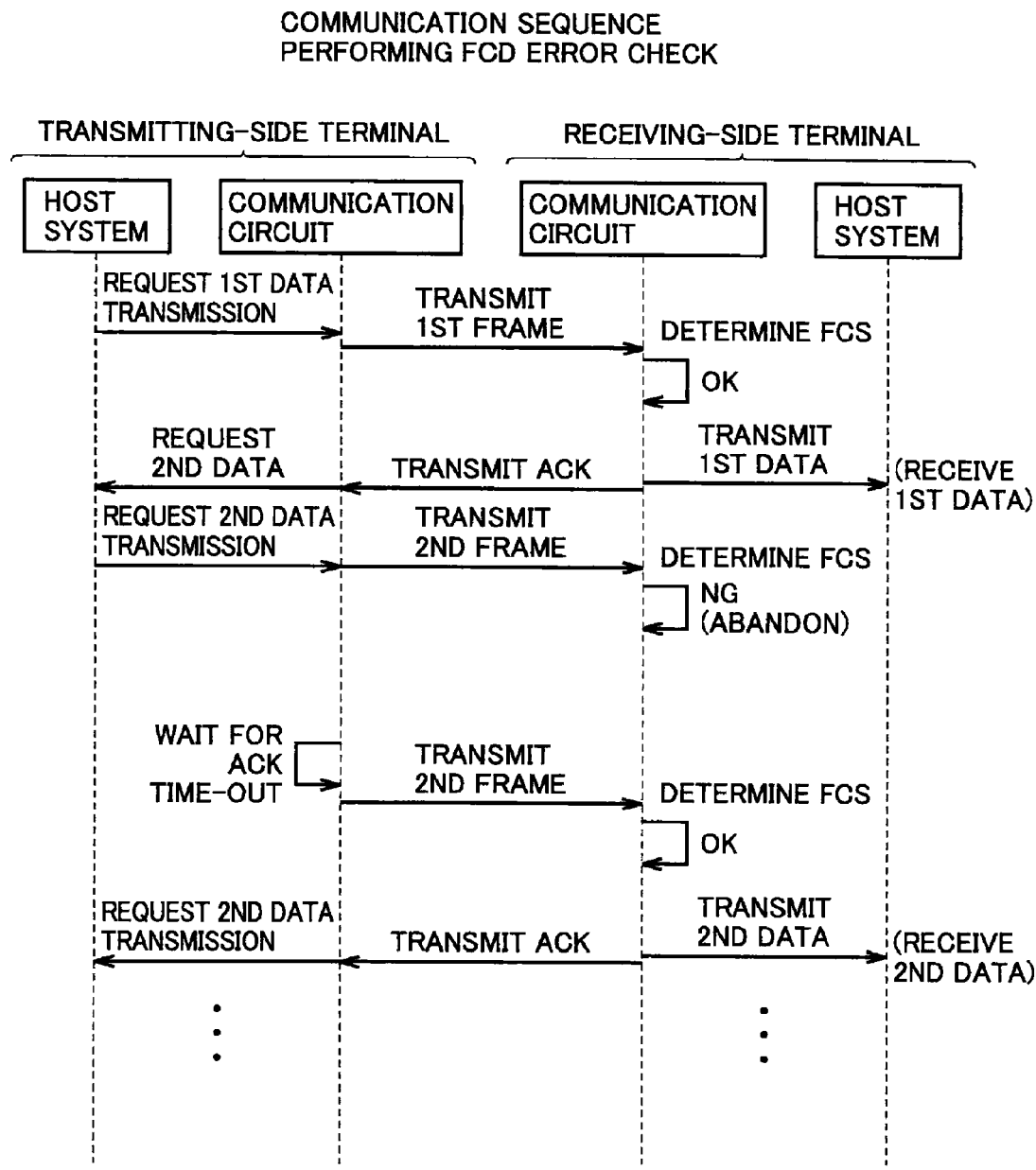
FIG. 46 schematically shows a communication sequence performing conventional FCS check.

Referring to FIG. 45, the processing in terminal STA1 on the receiver side will be described below. It is assumed that shared memory 2551 in communication circuit 2001 of terminal STA1 has stored data 2711 of the filter conditions shown in FIG. 38.

In step SL10, it is determined whether any frame is received from network 10 or not. When the frame is received, control MAC unit 2571 takes out only frame body portion 320 from the received frame, and temporarily stores it in program memory 2541.

In step SL12, CPU 2511 determines based on data 2721 in shared memory 2551 whether the filter function is enabled or not. In this stage, it is determined that the filter function is enabled (YES in step SL12), and the process proceeds to step SL13. When it is determined the filter function is not enabled, i.e., is disabled (NO in step SL12), all the frames are received so that the process proceeds to step SL53. The processing in step SL53 is performed to read the data of the received frame from program memory 2541, and transmits it to host system 1001 via an interface 2521.

In step SL13, CPU 2511 reads communication mode information 327 of frame body portion 320 stored in program memory 2541 as well as filter condition data 2721 of shared memory 2551. Thereafter, information 327 and data 2721 thus read are checked, and the filtering processing is performed.

In step SL16, CPU 2511 determines whether communication mode information 327 indicates the standard ad hoc mode ("STANDARD") or not. When this mode is indicated (YES in step SL16), it is determined in step SL19 based on filter designation data 2711 whether the data provided from the terminal in the standard ad hoc mode is to be filtered or not. In this stage, as shown in FIG. 38, it is determined that the data in the standard ad hoc mode is not to be filtered ("OFF") (NO in step SL19), this data will be stored in program memory 2541 until it is transmitted to host system 1001 later.

Conversely, when it is determined that the standard ad hoc mode is to be filtered (YES in step SL19), CPU 2511 deletes the received data temporarily stored in program memory 2541, and then ends the reception (no reception completion frame). Thereby, the data of the received frame is abandoned.

Returning to step SL16, when it is determined that standard ad hoc mode is not instructed (NO in step SL16), it is determined in steps SL27 and SL30 whether communication mode information 327 indicates the intermittent transmission-reception ad hoc mode ("INTMT") or the scanless ad hoc mode ("SCNLS"), or not.

When it is determined that neither of them is indicated (NO in steps SL27 and SL30), CPU 2511 detects in step SL33 that the data of the frame in question is not appropriate, and deletes the frame body data that has been temporarily stored in program memory 254. Thereby, the data of the received frame is abandoned.

When it is determined that communication mode information 327 indicates "INTMT" (YES in step SL27), CPU 2511 determines based on filter designation data 2711 in step SL36 whether the data of the intermittent transmission-reception ad hoc mode is to be filtered or not. As is indicated by data 2711 in FIG. 38, the data in the intermittent transmission-reception ad hoc mode ("INTMT") is designated as the data to be filtered, it is determined that the data is to be filtered (YES in step SL36), and the reception ends without the reception completion frame in step SL43. When it is determined that the data is not to be filtered (NO in step SL36), the data temporarily stored in program memory 2541 will be kept therein in steps SL39 and SL50 until it is transmitted to the host system 1001 side (reception completion frame is present).

When it is determined in step SL30 that communication mode information 327 indicates "SCNLS" (YES in step SL30), CPU 2511 determines based on data 2711 in step SL46 whether the data in the scanless ad hoc mode is to be filtered or not. In the case shown in FIG. 38, it is designated that the data in the scanless ad hoc mode is to be filtered, it is determined that the filtering is to be performed (YES in step SL46), and the processing in and after step SL43 already described is performed. When it is determined that the filtering is not to be performed (NO in step SL46), the data temporarily stored in program memory 2541 will be kept until it is transmitted to host system 1001 side in steps SL49 and SL53 (reception completion frame is present).

According to the embodiment described above, the transmission of the user-defined communication mode of the terminal as well as the filtering of the frame according to the type of the communication mode in question can be performed, using the frame employed for managing the wireless LAN. Although the communication mode of the terminal is the user-defined information, another type of attribute of the terminal may be employed, and the filtering according to another attribute may be employed.

According to the filtering of the embodiment, the user-defined information is transmitted and received using the management frame (Beacon frame). Therefore, as compared with the case where a dedicated frame is used for transmitting and receiving the user-defined information, the amount of the frames transmitted and received over network 10 can be reduced, and the communication efficiency can be improved.

Further, it is possible to implement the function that selectively receives only Beacon frame 30 from the terminal of the desired attribute according to the user-defined information. Provision of this function can increase added value of the wireless LAN equipment formed of terminal 1 including host system 100.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information communication terminal comprising:
   a receiving unit that received an externally transmitted frame;
   a correction processing unit that corrects an error in data, said correction processing unit being configured:
      in a state for performing the error correction, to output said data after performing error correction according to correction information in said frame on the data in said frame received by said receiving unit, and
      in a state for not performing the error correction, to output said data without performing the error correction on the data in said frame received by said receiving unit; and
   a determining unit that determines whether the error correction is to be performed on said correction processing unit or not, wherein said determining unit determines, in response to every reception of said frame by said data receiving unit, based on correction enable/disable data whether said error correction is to be performed or not, and causes said correction processing unit to perform the error correction on the data in said received frame when said determining unit determines that said error correction is to be performed.

2. The information communication terminal according to claim 1, wherein setting of said correction enable/disable data is changeable.

3. An information communication terminal comprising:
   a receiving unit that received an externally transmitted frame;
   a correction processing unit that corrects an error in data, said correction processing unit being configured:
      in a state for performing the error correction, to output said data after performing error correction according to correction information in said frame on the data in said frame received by said receiving unit, and
      in a state for not performing the error correction, to output said data without performing the error correction on the data in said frame received by said receiving unit; and
   a determining unit that determines whether the error correction is to be performed on said correction processing unit or not,
   wherein said receiving unit includes a correction enable/disable receiving unit receiving a notification about error correction enable/disable transmitted from a different information communication terminal, and
   said correction enable/disable data is said notification about the error correction enable/disable received in advance by said error correction enable/disable receiving unit.

4. An information communication terminal performing communications over a radio network, and comprising:
   a receiving unit receiving a frame transmitted from a different information communication terminal; and a processing unit accepting and processing data in said frame received by said receiving unit, wherein said receiving unit includes:

a data receiving unit receiving the frame storing said data and correction information for error correction from said different information communication terminal, a correction processing unit performing the error correction on said data in said frame received by said data receiving unit according to said correction information in said frame, and then providing said data to said processing unit, and a correction determining unit determining, in response to every reception of said frame by said data receiving unit, based on preset correction enable/disable data whether said error correction is to be performed or not, and providing said data in said frame received by said data receiving unit to said processing unit without performing said correction processing by said correction processing unit when said correction determining unit determines that said error correction is not to be performed.

5. The information communication terminal according to claim 4, wherein said correction determining unit determines, in response to every reception of said frame by said data receiving unit, based on said correction enable/disable data whether said error correction is to be performed or not, and causes said correction processing unit to perform the error correction on the data in said received frame when said determining unit determines that said error correction is to be performed.

6. The information communication terminal according to claim 4, wherein setting of said correction enable/disable data is changeable.

7. The information communication terminal according to claim 4, wherein said receiving unit includes a correction enable/disable receiving unit receiving a notification about error correction enable/disable transmitted from said different information communication terminal, and said correction enable/disable data is said notification about the error correction enable/disable received in advance by said error correction enable/disable receiving unit.

8. The information communication terminal according to claim 4, wherein said data is uncompressed audio data or uncompressed visual data.

9. The information communication terminal according to claim 4, wherein said radio network is an ad hoc communication network.

10. A radio communication apparatus being capable of communications over a radio network, being arranging in an information communication terminal having a processing unit, and comprising a receiving unit receiving a frame transmitted from said different information communication terminal, and providing data in the received frame to said processing unit of said information communication terminal, wherein said receiving unit includes:

a data receiving unit receiving the frame storing said data and correction information for error correction from said different information communication terminal, a correction processing unit performing the error correction on said data in said frame received by said data receiving unit according to said correction information in said frame, and then providing said data to said processing unit, and a correction determining unit determining, in response to every reception of said frame by said data receiving unit, based on preset correction enable/disable data whether said error correction is to be performed or not, and providing said data in said frame received by said data receiving unit to said processing unit without performing said correction processing by said correction processing unit when said correction determining unit determines that said error correction is not to be performed.

11. A radio communication network system comprising:

a first information communication terminal; and a second information communication terminal receiving data transmitted by said first information communication terminal, wherein said first information communication terminal includes a data transmitting unit transmitting a frame storing data and correction information for error correction, said second information communication terminal includes:

a receiving unit receiving the frame transmitted from said data transmitting unit of said first information communication terminal, and a processing unit accepting and processing the data in said frame received by said receiving unit; and said receiving unit includes:

a data receiving unit receiving said frame transmitted from said data transmitting unit of said first information communication terminal, a correction processing unit performing the error correction on said data in said frame received by said data receiving unit according to said correction information in said frame, and then providing said data to said processing unit, and a correction determining unit determining, in response to every reception of said frame by said data receiving unit, based on preset correction enable/disable data whether said error correction is to be performed or not, and providing said data in said frame received by said data receiving unit to said processing unit without performing said correction processing by said correction processing unit when said correction determining unit determines that said error correction is not to be performed.

12. The information communication terminal of claim 3 wherein setting of said correction enable/disable data is changeable.

* * * * *